United States Patent
Miyajima et al.

(10) Patent No.: US 6,517,120 B1
(45) Date of Patent: Feb. 11, 2003

(54) QUICK CONNECTOR

(75) Inventors: Atsuo Miyajima, Inuyama (JP); Kazushige Sakazaki, Komaki (JP); Akira Takayanagi, Nishikasugai-gun (JP); Tomohide Ito, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/830,601

(22) PCT Filed: Sep. 26, 2000

(86) PCT No.: PCT/JP00/06620

§ 371 (c)(1),
(2), (4) Date: Apr. 27, 2001

(87) PCT Pub. No.: WO01/23798

PCT Pub. Date: Apr. 5, 2001

(30) Foreign Application Priority Data

Sep. 28, 1999 (JP) ............................. 11-274134
Apr. 24, 2000 (JP) ........................... 2000-122305
Sep. 20, 2000 (JP) ........................... 2000-284833

(51) Int. Cl.$^7$ ................................................ F16L 37/00
(52) U.S. Cl. ...................... 285/305; 285/319; 285/921
(58) Field of Search ................................ 285/319, 305, 285/921

(56) References Cited

U.S. PATENT DOCUMENTS 5,154,450 A    10/1992  Washizu
5,915,738 A     6/1999  Guest

FOREIGN PATENT DOCUMENTS

| JP | 3-219189    | 9/1991  |
| JP | 8-210576    | 8/1996  |
| JP | 11-201355   | 7/1999  |
| JP | 2000-329278 | 11/2000 |
| JP | 11-115848   | 4/2002  |

Primary Examiner—J. J. Swann
Assistant Examiner—Carlos Lugo
(74) Attorney, Agent, or Firm—Burr & Brown

(57) ABSTRACT

A quick connector including: (a) a tubular male element having an introduced end portion which has an extreme end portion and an annular protrusion portion; and (b) a tubular female element having a first receiving portion and a second receiving portion which have respective tubular shapes configured to receive therein the annular protrusion portion and the extreme end portion of the introduced end portion of the tubular male element, respectively. The first receiving portion has an elastically-deformable tongue portion which is defined by a U-shaped slot formed through the cylindrical wall of the first receiving portion. The tongue portion extends in a circumferential direction of the tubular female element, and has a free end portion which is displaceable in a radial direction of the tubular female member. An engaging protrusion portion is provided in the free end portion so as to protrude inwardly in the radial direction so as to be brought into engagement with the annular protrusion portion of the introduced end portion of the tubular male element in a snap action manner. The engaging protrusion portion preferably has a tapered guide surface in its inner surface.

15 Claims, 15 Drawing Sheets

(a)

(b)

(a)

(b)

(a)

(b)

(a)

(b)

QUICK CONNECTOR

FIELD OF THE INVENTION

The present invention relates in general to a quick connector including a tubular male element which has an annular protrusion portion formed on an outer circumferential surface of an introduced end portion of the male element and spaced apart form an axial end of the male element by a predetermined distance, and a tubular female element which has in its axially opposite end portions an opening portion into that the tubular male element is introduced whereby the tubular male and female elements are connected to each other.

BACKGROUND OF THE INVENTION

Conventionally, as this kind of quick connectors, there have been proposed various ones having respective constructions. For example, in a quick connector as disclosed in JP-A-03-219189 and U.S. Pat. No. 5,154,450, the female element is provided by a tubular connector body which has a window formed through its cylindrical wall, and a socket body which has an elastic claw wall protruding inwardly in the radial direction. The socket body is fitted onto the connector body, by moving the socket body from one of opposite sides of the connector body onto the connector body, such that the elastic claw wall of the socket body protrudes through the window of the connector body into a bore of the connector body. The elastic claw wall is brought into engagement with an annular swelling wall portion of the tubular male element, which is introduced into the bore of the connector body, whereby the connector body and the tubular male element are quickly connected to each other. For providing a fluid tightness between the male element and the connector body, an O-ring is provided to be fitted in the bore of the connector body. The O-ring is held by a bushing member which is formed independently of the connector body and the socket body and which is fitted in the bore of the connector body.

In this quick connector constructed as described above, the male element is introduced into the female element in which the socket body is fitted in an opening portion of the connecter body. This construction inevitably increases the diameter of the female element and accordingly increases the size of the entirety of the connector, causing a problem in installation of the connector which requires to be installed in a relatively narrow space. Further, the bushing member is provided to exclusively hold the O-ring or other elastic sealing ring member which is fitted in the bore of the connector body. The provision of the bushing member requires an additional step in the assembling process and also increases the number of the required components, resulting in an increased cost of manufacturing of the quick connector.

In a connector designed for connecting pipe of small diameter, which is disclosed in JP-A-08-210576, there is employed a construction in which a generally U-shaped slit is formed through a cylindrical wall of a connector body as the male element, whereby an elastic claw wall defined by the U-shaped slit is formed integrally with the connector body. The elastic claw wall is biased to be inclined inwardly in the radial direction of the connector body, so that an annular swelling wall of the male element (pipe) which is introduced into the connector body is brought into engagement with the elastic claw wall. However, this connector body having the construction, in which the elastic claw wall is biased to be inwardly inclined, has a configuration that is extremely difficult to be manufactured. It is considered that such a connector body is practically impossible to be produced in an injection molding operation that is very common to be practiced for efficiently producing a connector body. Even if such a connector body could be produced in an injection molding operation, it would be necessary to prepare a mold having an extremely complicated construction. Further, this connector includes a bushing member exclusively used to hold a sealing member which provides a fluid tightness between the connector body and the introduced pipe, for preventing the sealing member from coming off from the connector. The use of the bussing member problematically complicates the assembling process, deteriorates the efficiency of the manufacture, and increases the number of the required components, as in the above-described connector disclosed in JP-A-03-219189.

Further, JP-A-11-201355 discloses a quick connector including a tubular connector body (female element) and a holding member which has a generally C-shaped cross section and which is fitted in an axial end portion of the tubular connector body to be fixed to the tubular connector body. The holding member is brought into engagement with an annular protrusion portion formed in an outer circumferential surface of the male element in the form of a pipe, which is introduced into the holding member, so. that the connector body and the pipe are connected with each other. Owing to the cross sectional shape of the holding member, the tubular connector body, the holding member and the pipe are easily removable from each other, without using an releasing tool or other exclusive tool. However, this connector still has not provided a substantial solution to the problems encountered in the above-described two types of connectors.

That is, even in the construction of the connector disclosed in JP-A-11-201355, the diameter of the connector body is inevitably increased due to the introduction of the holding member in the axial end portion of the connector body, thereby still resulting in an increase in size of a connecting portion of the connector at which the connector is connected with the pipe. Further, in the interest of permitting the operation for removing the holding member from the connector body without using a releasing tool, the holding member is designed to protrude outwardly from the end portion of the connector body, thereby problematically increasing the (axial) length of the connector. Still further, this connector also requires, in addition to the holding member, another independent member in the form of a bushing member that is exclusively used to hold an O-ring as a sealing member, thereby complicating the assembling process and increasing the number of the components.

SUMMARY OF THE INVENTION

The present invention was developed under the above-described background situation. An object to be achieved by the present invention is to provide a quick connector which is capable of being more compact in its radial and longitudinal (axial) dimensions with a smaller -number of its components, than a conventional quick connector. Another object of the invention is to improve efficiencies of assembling and production of a quick connector with a reduced production cost, by reducing the number of the components.

The above technical object may be achieved according to the essence of the present invention, which provides a quick connector for providing a quick connection, characterized by comprising: (a) a tubular male element having an introduced end portion which straightly extends and which has an extreme end portion and an annular protrusion portion located rearwardly of and adjacently to the extreme end portion; and (b) a tubular female element having a first receiving portion and a second receiving portion which have respective tubular shapes configured to receive therein the annular protrusion portion and the extreme end portion of the introduced end- portion, respectively; wherein the first receiving portion extends from an axial end of the tubular female element toward the other axial end of the tubular female element, and has an axial hole into which the introduced end portion of the tubular male element is introduceable through an opening of the axial hole that is open in the axial end of the tubular female element; wherein the second receiving portion is located on one of opposite sides of the first receiving portion that is closer to the other axial end of the tubular female element than the other of the opposite sides of the first receiving portion such that the first and second receiving portions have a coaxial relation with each other; wherein the first receiving portion has a plurality of tongue portions each of which is elastically deformable and extends in a circumferential direction of the tubular female element, so as to prevent removal of the tubular male element from the axial hole when the introduced end portion of the tubular male element is introduced into the axial hole; wherein the first receiving portion has a plurality of beam portions which consist of respective parts of a cylindrical wall of the first receiving portion so as to be located on a same circle, and which extend in an axial direction of the tubular female element and are. spaced apart from each other by a predetermined spacing distance in the circumferential direction of the tubular female element; wherein each of the tongue portions is defined by a U-shaped slot which is formed through the cylindrical wall of the first receiving portion and which extends in a U-shaped manner from the corresponding one of the beam portions, such that the tongue portion extends from the corresponding beam portion in the circumferential direction over a distance not larger than the predetermined spacing distance; wherein each of the tongue portions has, in a free end portion thereof, an engaging protrusion portion which protrudes inwardly in a radial direction of the tubular female element so as to be brought into engagement with the annular protrusion portion of the introduced end portion of the tubular male element in a snap action manner; and wherein the engaging protrusion portion has, in an inner surface thereof, a guide surface whose diameter gradually reduces as viewed in a direction toward the other axial end of the tubular female element away from the axial end of the tubular female element.

In the quick connector constructed according to this invention, the tubular female element has the elastically deformable tongue portions formed integrally in its axially intermediate portion. The annular protrusion portion of the male element, which is introduced into the female element, is permitted by elastic deformation of the tongue portions, to climb over the engaging protrusion portions of the respective tongue portions, and is then brought into engagement with the tongue portions in a snap action manner. :Owing to the engagement of the annular protrusion portion of the male element with the tongue portions of the female element, the male element is connected to and held by the female element. This construction eliminates a member used for exclusively holding the male element, and accordingly makes the present connector to be compact in size with a smaller diameter of the female element and a smaller number of the required components, than a conventional connector having a construction in which an exclusive member is provided in the connector body as the female element into that the male element is introduced. Further, since each of the tongue portions is formed to extend in the circumferential direction, it is possible to avoid an increase in the axial length of the female element of the present connector due to the formation of the tongue portions.

Therefore, the quick connector according to the present invention can be compact in size with smaller diameter and (axial) length than those of the conventional quick connector, and accordingly makes it to possible to improve the efficiency of assembling or production of the connector with a reduced cost, owing to the reduced number of the required components.

Further, in the quick connector of the present invention, the engaging protrusion portion which is brought into engagement with the annular protrusion portion of the male element in a snap action manner has, in its inner surface, the guide surface whose diameter gradually reduces as viewed in the direction in which the male element is introduced into the axial hole of the female element. The guide surface is inclined with respect to the axis of the tubular female element such that a radial distance between the guide surface and the axis reduces as viewed in the abovedescribed direction in which the male element is introduced into the axial hole of the female element. Owing to this construction, the tongue portion can be elastically deformed so as to be then brought into engagement with the annular protrusion portion of the male element in a snap action manner, through a one-touch operation in which the introduced end portion of the male element is simply pushed into the axial hole of the female element. That is, the male element easily comes to be held by the female element, with a single movement of the male element and the female element toward each other. Thus, this construction advantageously facilitates the operation for connecting the male element with the female element, thereby permitting the connector to be more easy to operate.

The above-described technical object may be achieved according to the essence of the present invention, which provides a quick connector for providing a quick connection, characterized by comprising: (a) a tubular male element having an introduced end portion which straightly extends and which has an extreme end portion and an annular protrusion portion located rearwardly of and adjacently to the extreme end portion; (b) a tubular female element having a first receiving portion and a second receiving portion which have respective tubular shapes configured to receive therein the annular protrusion portion and the extreme end portion of the introduced end portion, respectively, and (c) an annular sealing member for assuring a fluid-tightness between the tubular male element and the tubular female element, wherein the first receiving portion extends from an axial end of the tubular female element toward the other axial end of the tubular female element, and has an axial hole into which the introduced end portion of the tubular male element is introduceable through an opening of the axial hole that is open in the axial end of the tubular female element; wherein the second receiving portion has an inner circumferential surface whose inside diameter is sufficiently larger than an outside diameter of the extreme end portion of the tubular male element, and is located on one of opposite sides of the first receiving portion that is closer to the other axial end of the tubular female element than the other of the opposite sides of the first receiving portion such that the first and second receiving portions have a coaxial relation with each other; wherein the tubular female element has an annular stop element which is located in an entrance portion of the second receiving portion and which protrudes radially inwardly from an inner circumferential surface of the entrance portion of the second receiving portion, the annular stop element having an inside diameter that is slightly larger than the outside diameter of the extreme end portion of the tubular male element, so that the annular stop element is opposed to the annular protrusion portion of the tubular male element so as to be brought into abutting-contact with the annular protrusion portion, for thereby limiting movement of the tubular male element toward the other axial end of the tubular female element away from the axial end of the tubular female element, when the introduced end portion of the tubular male element is introduced into the axial hole; wherein the tubular female element has a plurality of tongue portions which are provided in the first receiving portion, each of the tongue portions being elastically deformable and extends in a circumferential direction of the tubular female element, so as to prevent removal of the tubular male element from the axial hole when the introduced end portion of the tubular male element is introduced into the axial hole; wherein the first receiving portion has a plurality of beam portions which consist of respective parts of a cylindrical wall of the first receiving portion so as to be located on a same circle, and which extend in an axial direction of the tubular female element and are spaced apart from each other by a predetermined spacing distance in the circumferential direction of the tubular female element; wherein each of the tongue portions is defined by a U-shaped slot which is formed through the cylindrical wall of the first receiving portion and which extends in a U-shaped manner from the corresponding one of the beam portions, such that the tongue portion extends from the corresponding beam portion in the circumferential direction over a distance not larger than the predetermined spacing distance; wherein each of the tongue portions has, in a free end portion thereof, an engaging protrusion portion which protrudes inwardly in a radial direction of the tubular female element so as to be brought into engagement with the annular protrusion portion of the introduced end portion of the tubular male element in a snap action manner; wherein the engaging protrusion portion has, in an inner surface thereof, a guide surface whose diameter gradually reduces as viewed in a direction toward the other axial end of the tubular female element away from the axial end of the tubular female element; and wherein the sealing member is disposed on one of opposite sides of the annular stop element that is closer to the other axial end of the tubular female element than the other of the opposite sides of the annular stop element such that the sealing member is held in contact at an outer peripheral portion thereof with the inner circumferential surface of the second receiving portion, the sealing member being gripped between the extreme end portion of the tubular male element and the second receiving portion of the tubular female element when the introduced end portion of the tubular male element is introduced into the axial hole.

The quick connector according to the present invention has the male element which has the annular protrusion portion provided in its introduced end portion, and the female element which is configured to be capable of introducing therein the male element and which has the tongue portions that are formed integrally with the main body of the female element and that extend in the circumferential direction. The tongue portions of the female element are elastically deformable so as to be brought into engagement with the annular protrusion portion of the male element when the male element is introduced into the female element. Thus, this construction permits the connector to be compact in size with smaller diameter and (axial) length than those of the conventional quick connector, and accordingly makes it to possible to improve the efficiency of assembling or production of the connector with a reduced cost, owing to the reduced number of the required components.

In addition, the quick connector according to the present invention further includes the annular sealing member for providing a fluid tightness between the male element and the female element when the male element is introduced into the female element. The sealing member is disposed on a downstream side of the stop element that is provided in an inner wall of the second receiving portion, as viewed in the direction in which the male element is introduced into the female element. Thus, the sealing member can be effectively held in position by abutting-contact of the sealing member with the stop element, for example, when the male element is pulled out of the female element.

The above-described technical object may be achieved according to the essence of the present invention, which provides The above-described technical object may be achieved according to the essence of the present invention, which provides a quick connector for providing a quick connection, characterized by comprising: (a) a tubular male element having an introduced end portion which straightly extends and which has an extreme end portion and an annular protrusion portion located rearwardly of and adjacently to the extreme end portion; (b) a tubular female element having a first receiving portion and a second receiving portion which have respective tubular shapes configured to receive therein the annular protrusion portion and the extreme end portion of the introduced end portion, respectively, and (c) an annular sealing member for assuring a fluid-tightness between the tubular male element and the tubular female element, wherein the first receiving portion extends from an axial end of the tubular female element toward the other axial end of the tubular female element, and has an axial hole into which the introduced end portion of the tubular male element is introduceable through an opening of the axial hole that is open in the axial end of the tubular female element; wherein the second receiving portion has an inner circumferential surface whose inside diameter is sufficiently larger than an outside diameter of the extreme end portion of the tubular male element, and is located on one of opposite sides of the first receiving portion that is closer to the other axial end of the tubular female element than the other of the opposite sides of the first receiving portion such that the first and second receiving portions have a coaxial relation with each other; wherein the tubular female element has an annular stop element which is located in an entrance portion of the second receiving portion and which protrudes radially inwardly from an inner circumferential surface of the entrance portion of the second receiving portion, the annular stop element having a radially-extending annular surface and an inside diameter that is slightly larger than the outside diameter of the extreme end portion of the tubular male element, so that the annular stop element is opposed to the annular protrusion portion of the tubular male element so as to be brought into abutting-contact with the annular protrusion portion, for thereby limiting movement of the tubular male element toward the other axial end of the tubular female element away from the axial end of the tubular female element, when the introduced end portion of the tubular male element is introduced into the axial hole; wherein the tubular female element has a plurality of tongue portions which are provided in the first receiving portion, each of the tongue portions being elastically deformable and extends in a circumferential direction of the tubular female element, so as to prevent removal of the tubular male element from the axial hole when the introduced end portion of the tubular male element is introduced into the axial hole; wherein the first receiving portion has a plurality of beam portions which consist of respective parts of a cylindrical wall of the first receiving portion so as to be located on a same circle, and which extend in an axial direction of the tubular female element and are spaced apart from each other by a predetermined spacing distance in the circumferential direction of the tubular female element; wherein each of the tongue portions is defined by a U-shaped slot which is formed through the cylindrical wall of the first receiving portion and which extends in a U-shaped manner from the corresponding one of the beam portions, such that the tongue portion extends from the corresponding beam portion in the circumferential direction over a distance not larger than the predetermined spacing distance; wherein each of the tongue portions has, in a free end portion thereof, an engaging protrusion portion which protrudes inwardly in a radial direction of the tubular female element so as to be brought into engagement with the annular protrusion portion of the introduced end portion of the tubular male element in a snap action manner; wherein the engaging protrusion portion has, in an inner surface thereof, a guide surface whose diameter gradually reduces as viewed in a direction toward the other axial end of the tubular female element away from the axial end of the tubular female element; and wherein the sealing member is disposed on one of opposite sides of the annular stop element that is closer to the other axial end of the tubular female element than the other of the opposite sides of the annular stop element such that the sealing member is held in contact at an outer peripheral portion thereof with the inner circumferential surface of the second receiving portion, the sealing member being gripped between the extreme end portion of the tubular male element and the second receiving portion of the tubular female element when the introduced end portion of the tubular male element is introduced into the axial hole.

In the quick connector according to the present invention, too, the number of the required components and the radial and axial dimensions of the connector are made smaller than in conventional various types of connectors, resulting in an improved efficiency of assembling or production of the connector with a reduced cost.

In the quick connector according to the present invention, where the connector includes the annular sealing member for assuring a fluid-tightness between the male element and female element, an O-ring is preferably used as the sealing member.

According to a preferred form of the quick connector according to the present invention, the U-shaped slot has a first slot part which is formed between a side face of the tongue portion that is closer to the axial end of the tubular female element than the other side face of the tongue portion, and a first slot defining face that is formed in the cylindrical wall of the first receiving portion and that is opposed to the side face of the tongue portion, the first slot part extending in the circumferential direction of the tubular female element; wherein the tubular female element has a first restricting protrusion which is provided in one of the free end portion of the tongue portion and an opposed portion of the first slot defining face opposed to the free end portion, and which protrudes into the first slot part; and wherein the tubular female element has a first recess portion which is provided in one of the free end portion of the tongue portion and the opposed portion of the first slot defining face, so that the first restricting protrusion is superposed on the first recess portion in the radial direction so as to be brought into engagement with the first recess portion, when the free end portion of the tongue portion is forced by the annular protrusion portion of the tubular male element to be displaced in a direction that causes the tubular male element to be pulled out of the tubular female element, upon application of a pulling force between the tubular male element and the tubular female element.

This construction prevents the tongue portion (the engaging protrusion portion) and the male element (the annular protrusion) from being easily disengaged from each other, even when at least one of the male element and the female element is forced in a direction that causes the male element to be pulled out of the male element. That is, the construction prevents the tongue portion from being displaced outwardly in the radial direction of the female element, when the pulling force acts between the male element and the female element. Thus, the linkage or connection of the male element with the female element is maintained with an increased reliability.

According to another preferred form of the quick connector according to the present invention, the tubular female element has a second restricting protrusion which extends across the U-shaped slot, from one of the free end portion of the tongue portion and an opposed portion of a slot defining face that is formed in the cylindrical wall of the first receiving portion and that is opposed to the free end portion of the tongue portion; and wherein the tubular female element has a second recess portion which is provided in one of the free end portion of the tongue portion and the opposed portion of the slot defining face, such that the second restricting protrusion and the second recess portion are superposed on each other with a predetermined radial spacing distance therebetween in the redial direction, for thereby preventing the free end portion of the tongue portion from being displaced outwardly in the radial direction over a distance not smaller than the predetermined radial spacing distance.

In the thus constructed quick connector, the second restricting protrusion and the second recess portion, which are superposed on each other in the radial direction, may be adapted to be brought into contact with each other as a result of radially outward deformation of the tongue portion, for example, when the annular protrusion portion of the male element climbs over the engaging protrusion portion of the tongue portion. Thus, it is possible to prevent the tongue portion from being deformed outwardly in the radial direction in an excessive amount which is larger than an amount required for the annular protrusion portion of the male element to climb: over the engaging protrusion portion of the tongue portion.

Thus, in the connector according to the present invention, when the male element held by the female element is pulled out of the female element by the elastic deformation of the tongue portion in the radially outward direction, the tongue portion is prevented from being deformed in the excessive amount larger than the required amount, thereby effectively preventing the tongue portion from being damaged or broken.

According to still another preferred form of the quick connector according to the present invention, the U-shaped slot has a second slot part which is formed between the annular surface of the annular stop element and a side face of the tongue portion that is closer to the other axial end of the tubular female element than the other side face of the tongue portion, the second slot part extending in the circumferential direction of the tubular female element; and wherein the tubular female element has a third restricting protrusion which protrudes into the second slot part, from one of a portion of the side face of the tongue portion that is located in the free end portion, and a portion of the annular surface of the annular stop element that is opposed to the portion of the side face of the tongue portion, for thereby limiting displacement of the free end portion of the tongue portion toward the other axial end of the tubular female element, upon introduction of the introduced end portion of the tubular male element into the axial hole of the tubular female element.

When the annular protrusion of the introduced male element is intended to climb over the engaging protrusion portion of the tongue portion, the tongue portion is forced in the direction in which the male element is introduced into the female element. In the construction of this preferred form of the quick connector of the invention, the third restricting protrusion protruding from the above-described one of the portion of the side face of the tongue portion and the portion of the annular surface of the annular stop element is brought into contact with the other of the portion of the side face of the tongue portion and the portion of the annular surface of the annular stop element, for thereby effectively preventing the tongue portion from being excessively deformed, increasing a durability of the tongue portion and making it possible to repeat an operation for introducing the male element into the female element.

The quick connector according to the present invention preferably has a construction in which the tubular female element includes a first tubular member having axially opposite end portions one of which is provided by the first receiving portion, a second tubular member having axially opposite end portions one of which is provided by the second receiving portion, and connecting means for connecting the first and second tubular members such that the first tubular member is connected at the other of the axially opposite end portions thereof to the second receiving portion of the second tubular member, with a coaxial relationship between the first and second tubular members.

In the quick connector having the above construction, it is preferable to employ an arrangement in which the connecting means is constituted by a fitting hole which is formed in an entrance portion of the above-described one of the axially opposite end portions of the second tubular member, and the annular stop element which is provided in the other of the axially opposite portions of the first tubular member and which is fitted in the fitting hole. Further, in the quick connector having the above construction, it is advantageous to employ, in addition to or in place of the above arrangement, another arrangement in which the connecting means is constituted by an engaging portion which is formed in an outer circumferential surface of an entrance portion of the second receiving portion that is included in the above-described one of the axially opposite end portions of the second tubular member, and an engaging arm which extends from an outer circumferential surface of the annular stop element provided in the other of the axially opposite portions of the first tubular member toward the other of the axially opposite end portions of the second tubular member and which is brought into engagement with the engaging portion.

Each of the above arrangements is effective to simplify a connecting construction required for the firm connection of the two members which constitute the female element, facilitate an operation for connecting the two tubular members, and minimize an increase in the axial length of the connector due to the connecting construction.

According to still another preferred form of the quick connector according to the present invention, the tubular female element is provided by a single piece which is formed of a thermosetting resin material through a molding operation, for thereby further reducing the number of the required components of the quick connector. The further reduction in the number of the required components leads to a further improvement in the efficiency of assembling or production of the connector with a further reduced cost.

According to still another preferred form of the quick connector according to the present invention, each of the tongue portions has a width and/or a thickness that reduces as viewed in a direction toward the free end portion thereof away from a proximal end portion thereof at which the tongue portion is connected to the cylindrical wall portion of the first tubular member. The arrangement according to this preferred form of the connector is effective to prevent a local stress concentration in the proximal end portion of the tongue portion, thereby increasing a durability of the tongue portion.

According to still another preferred form of the quick connector according to the present invention, each of the tongue portions has an operating portion which protrudes radially outwardly from an outer circumferential surface of the free end portion. The provision of the operating portion facilitates an operation for removing the male element from the female element. That is, the tongue portion can be easily deformed outwardly in the radial direction, by simply forcing the operating portion outwardly in the radial direction, so that the engagement of the annular protrusion portion of the male element with the engaging protrusion portion of the tongue portion is easily released.

For achieving the above-described object, the quick connector according to the invention preferably comprises: a tubular male element having an annular protrusion portion provided on an outer circumferential surface of an introduced end portion of the tubular male element; and a female element having a tubular housing, wherein the tubular housing has an annular portion in one of axially opposite end portions thereof, through which the tubular male element is introduced into the tubular housing; a fitting end portion in the other of the axially opposite end portions thereof, onto which a tube is to be fitted so as to be fixed to the tubular housing; and an elastically deformable tongue portion which is formed by cutting through a cylindrical wall of an axially intermediate portion of the tubular housing and which extends in a circumferential direction of the tubular housing; wherein the tongue portion has a free end portion and a proximal end portion in one and the other of circumferentially opposite end portions thereof, respectively; and wherein the tongue portion has an engaging protrusion portion which is provided in an inner surface of the free end portion and which protrudes inwardly in a radial direction of the tubular housing, the tongue portion being deformed for permitting the annular protrusion portion of the male element to climb over the engaging protrusion portion upon introduction of the male element into the tubular housing, whereby the annular protrusion of the male element is brought into engagement with the engaging protrusion portion of the tongue portion.

In the quick connector in which the above-described construction is employed, the tubular female element has the elastically deformable tongue portion formed integrally in its axially intermediate portion. The tongue portion is deformable for permitting the annular protrusion portion of the male element to climb over the engaging protrusion portion of the tongue portion, upon introduction of the male element into the tubular housing, whereby the annular protrusion portion of the male element is brought into engagement with the engaging protrusion portion of the tongue portion in a snap action manner. Thus, the male element is connected with the female element and is held by the female element, with the engagement of the annular protrusion portion of the male element with the engaging protrusion portion of the tongue portion. This construction eliminates a member used for exclusively holding the male element, and accordingly makes the connector to be compact in size with a smaller diameter and a smaller number of the required components, as compared with a conventional connector having an exclusive member which is provided for holding the male element. Further, since each of the tongue portions is formed to extend in the circumferential direction, it is possible to avoid an increase in the axial length of the female element of the present connector due to the formation of the tongue portions.

Therefore, the quick connector according to the present invention can be compact in size with smaller diameter and (axial) length than those of the conventional quick connector, and accordingly makes it to possible to improve the efficiency of assembling or production of the connector with a reduced cost, owing to the reduced number of the required components.

For achieving the above-described object, the quick connector according to the invention preferably comprises: a tubular male element having an annular protrusion portion which is provided on an outer circumferential surface of an introduced end portion of the male element and which is spaced apart from an axial end of the male element by a predetermined distance; and a tubular female element having an opening end portion in one of axially opposite end portions thereof, through which the tubular male element is introduced into the tubular female element so as to be fixed to the tubular female element, wherein the tubular female element further having an annular portion which is provided in at least one of the axially opposite end portions and which extends continuously in a circumferential direction of the tubular female element; wherein the female element is constituted by a first tubular member which provides the opening end portion through that the introduced end portion of the male element is introduced, and a second tubular member which is connected to the annular portion of the first tubular member by connecting means such that the first and second tubular members have a coaxial relationship therebetween; wherein the second tubular member has a shoulder surface in its inner surface, so as to have a large diameter portion at which the second tubular member is connected with the first tubular member; wherein the connector further comprises an annular sealing member which is fitted in the inner surface of the large diameter portion; wherein the first tubular member has a plurality of integrally formed, elastically deformable tongue portions each of which is formed by cutting through a cylindrical wall of the first tubular member and each of which extends in a circumferential direction of the tubular housing; wherein the tongue portion has a free end portion and a proximal end portion in one and the other of circumferentially opposite end portions thereof, respectively; wherein the tongue portion has an engaging protrusion portion which is provided in an inner surface of the free end portion and which protrudes inwardly in a radial direction of the first tubular member, the tongue portion being deformed for permitting the annular protrusion portion of the male element to climb over the engaging protrusion portion upon introduction of the male element into the female element, whereby the annular protrusion of the male element is brought into engagement with the engaging protrusion portion of the tongue portion; wherein the first tubular member has a sealing-member stop portion in an axial end portion thereof at which the first tubular member is connected with the second tubular member, the sealing-member stop portion having a radially inner end which is distant from the axis of the female element by a radial distance smaller than a radius of the inner circumferential surface of the large diameter portion of the second tubular member; and wherein the annular sealing member, which is fitted in the large diameter portion, is interposed between the shoulder surface and the sealing-member stop portion as a result of the connection of the first and second tubular members, and is fluid-tightly gripped by and between the second tubular member and a portion of the outer circumferential surface of the tubular male member which portion is closer to the axial end of the tubular male member than the annular protrusion portion when the tubular member is introduced into the tubular housing body.

In the thus constructed quick connector, the first and second tubular members constituting the female element are connected at their respective axially end portions, in contrast to the arrangement in the conventional connector in which two members are connected with each other such that the two members are superposed on each other at their respective axially end portions, or such that one of the two members is completely mounted on or introduced in the other member. Therefore, it is possible to avoid an increase in the diameter of the female element. It is also possible to minimize the (axial) length of the female element, since the female element of the present connector does not require an axially protruding portion which would be required if one of the two tubular members were mounted on or introduced in the other tubular member. Thus, the present connector can be advantageously made compact in size, with minimized diameter and axial length thereof.

In the construction of the quick connector according to the present invention, the female element is constituted by the two tubular members. The plurality of tongue portions are provided in one of the two tubular members so as to be formed integrally with the tubular member, for engaging the introduced male element. The stepped inner circumferential surface in which the sealing member is fixed is provided in the other of the two tubular members. This construction is effective to simplify the configuration of each of the two tubular members, making it possible to easily produce each of tubular members, for example, in an injection molding operation, thereby improving the efficiency of production or manufacture of the connector, even where the tongue portions are designed to protrude into the bore of the corresponding one of the two tubular members.

Further, in the quick connector of the present invention, the sealing-member stop portion is provided in one of the two tubular members so as to be formed integrally with the tubular member. The sealing member, which is provided in the other of the two tubular members, is prevented by the sealing-member stop portion, from being pulled out of the other tubular member. This arrangement eliminates a bushing member or other member exclusively used to hold the sealing member, and also eliminates a conventionally required cumbersome operation for fitting such an exclusive member in a predetermined position, whereby the production efficiency and cost of the present connector are remarkably improved and lowered, respectively.

DETAILED DESCRIPTION OF THE INVENTION

Figure 1:
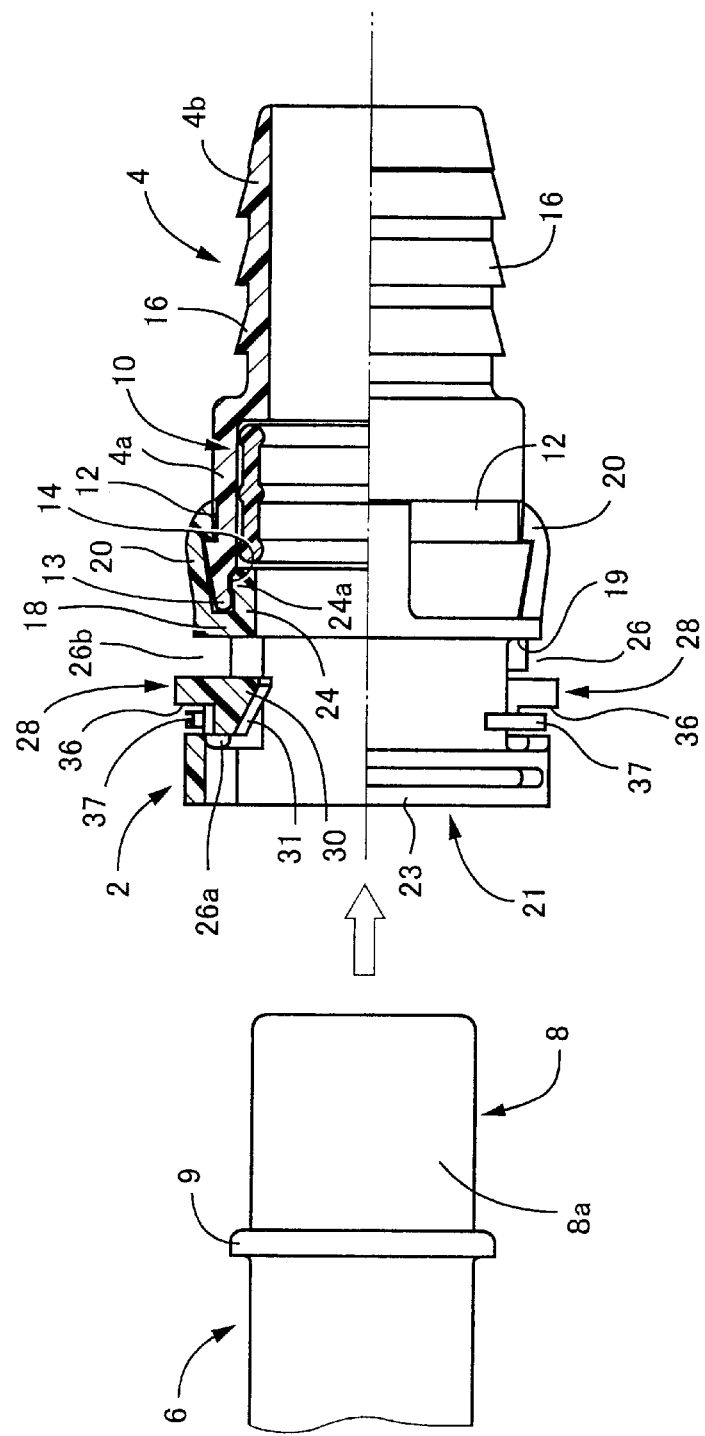
FIG. 1 is a view in partly cross section showing a typical example of a quick connector according to the present invention.

For further clarifying the present invention, a specific construction of a quick connector according to the present invention will be explained in detail referring to the drawings.

FIGS. 1–9 shows one embodiment of the quick connector according to the present invention. FIG. 1 shows a tubular female element constituted by a first tubular member 2 and a second tubular member 4 which is coaxially connected to the first tubular member 2, and a tubular male element in the form of a pipe 6 which is connected to an end portion of the female element. The pipe 6 includes an introduced end portion 8 having an extreme end portion 8a which straightly extends and an annular protrusion portion 9 which radially outwardly protrudes. The annular protrusion portion 9 is located rearwardly of and adjacently to the extreme end portion 8a. The pipe 6 is moved in a direction indicated by the arrow, so as to be introduced into the female element, whereby the pipe 6 is quickly connected to the female element such that the pipe 6 is removable from the female element.

Figure 8:
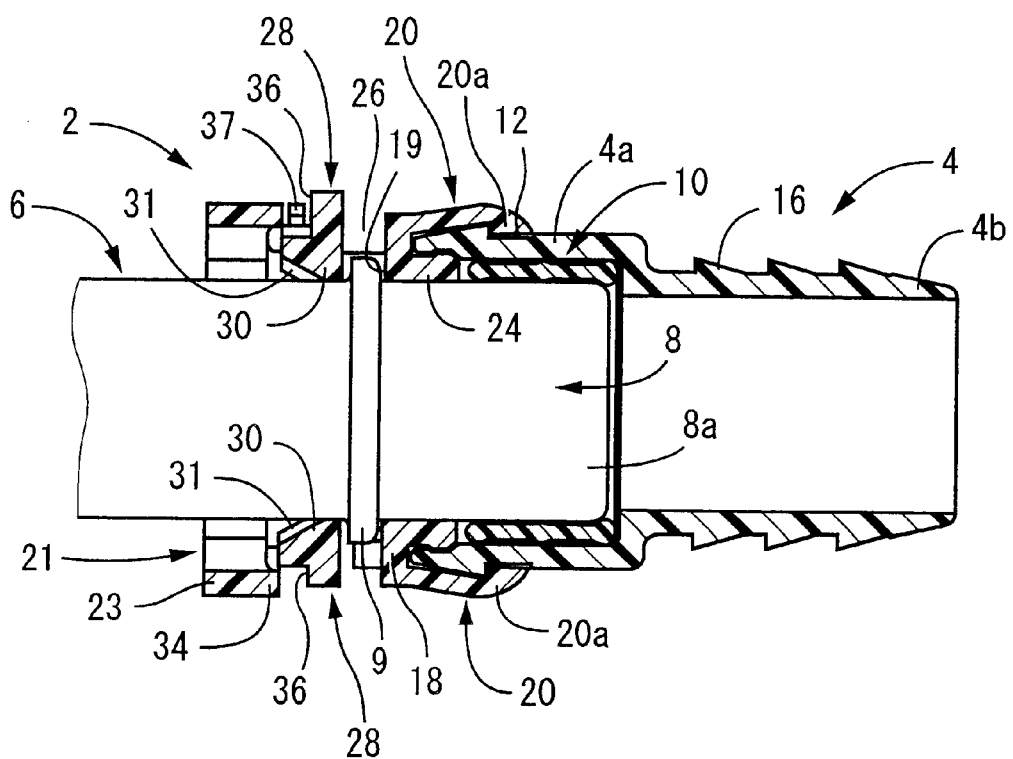
FIG. 8 is a cross sectional view showing the quick connector of FIG. 1 with a pipe being introduced into the female element of connector.
Figure 9:
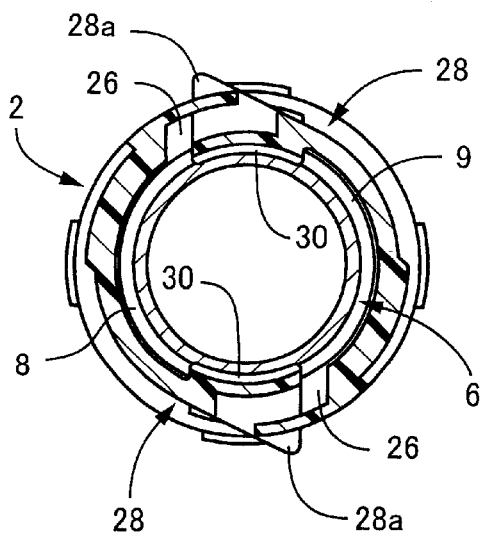
FIG. 9 are views showing a process of introducing the pipe into the female element of the quick connector of FIG. 1, wherein (a) is a cross sectional view taken in the direction in which the pipe is introduced into the female element, the view showing the quick connector when the introduction of the pipe into the female element is completed, and wherein (b) is a view corresponding to that of (a) and showing the quick connector when an annular protrusion portion of the pipe is climbing over tongue portions of the first tubular member constituting the female element.
Figure 9:
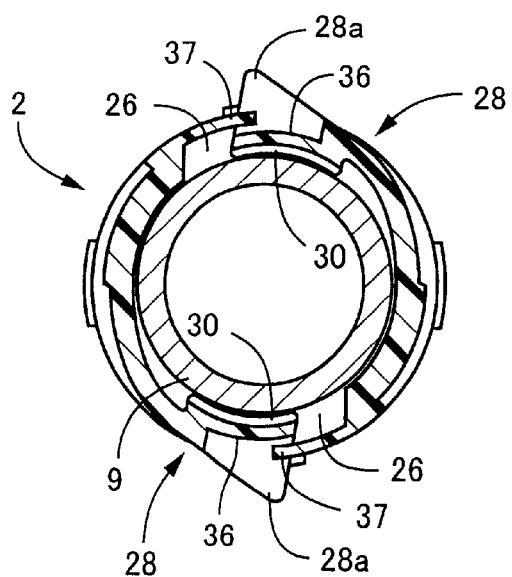

That is, the first tubular member 2 has circumferentially extending, elastically deformable tongue portions 28 in an end part of one of its opposite end portions (an end part of the left-side end portion as viewed in FIG. 1). The pipe 6 is moved relative to the female element in the direction indicated by the arrow, so that the introduced end portion 8 of the pipe 6 is introduced into the end part of the above-described one end portion of the first tubular member 2, whereby the annular protrusion portion 9 of the pipe 6 is brought into engagement with a free end portion of each tongue portion 28 in a snap action manner, as shown in FIG. 8. By this engagement, the pipe 6 is connected to the first tubular member 2 of the female element, without a risk of removal of the pipe 6 from the first tubular member 2. The first tubular member 2 cooperates with the second tubular member 4 to constitute the female element. The second tubular member 4 is connected at one of opposite end portions thereof to the first tubular member 2. The second tubular member 4 is configured such that a resin tube, rubber hose or other tubular body (not shown) can be fitted at its end portion on the other of the opposite end portions of the second tubular member 4, whereby the second tubular member 4 and the tubular body is connectable with each other.

Each of the first and second tubular members 2, 4 is provided by an integrally formed piece, which is made of a glass-fiber-reinforced nylon resin or other resin material, and which is commonly formed in an injection molding operation. The pipe 6 is made of a soft steel. The annular protrusion portion 9 is formed on an outer circumferential surface of the introduced end portion 8 through a drawing operation. The annular protrusion 9 is positioned so as to be spaced from an axial end of the pipe 6 by a predetermined distance. It is to be understood that the pipe 6 may be a resin pipe or tube.

Figure 2:
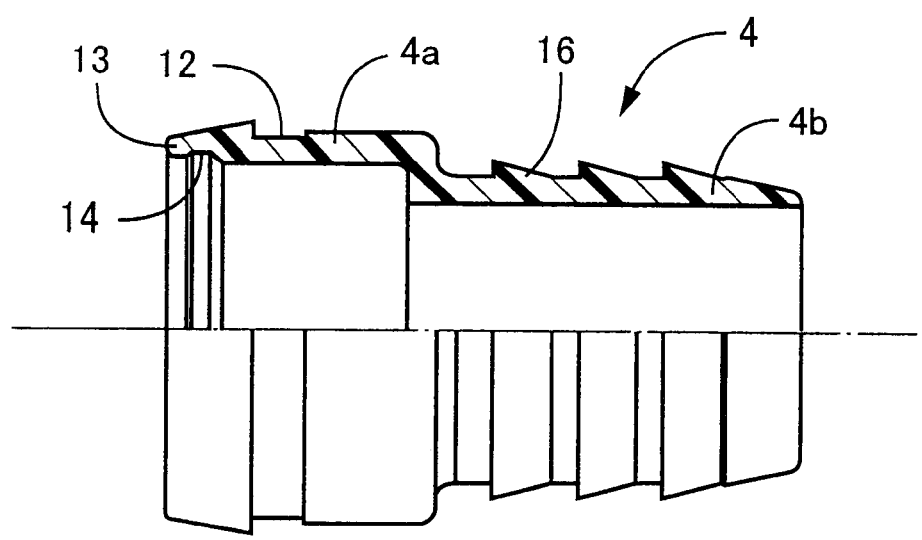
FIG. 2 is a view in partly cross section showing a second tubular member which constitutes a female element of the quick connector of FIG. 1.

The second tubular member 4, which is one of the two members constituting the female element, has stepped outer and inner circumferential surfaces, as shown in FIG. 2. That is, the second tubular member 4 consists of a large diameter portion 4a and a small diameter portion 4b so as to have a stepped tubular shape. In the large diameter portion 4a which serves as a second receiving portion, a tubular sealing member 10 is provided to be held in contact with the inner circumferential surface of the large diameter portion 4a (see FIG. 1). The large diameter portion 4a has an outside engaging portion in the form of an annular groove 12 formed in the outer circumferential surface of the large diameter portion 4a, and an inside engaging portion in the form of an annular groove 14 formed in the inner circumferential surface of an entrance portion 13 of the large diameter portion 4a. The small diameter portion 4b of the second tubular member 4 has a plurality of annular protrusion portions 16 which are formed on the outer circumferential surface and each of which has a tapered surface, so that the resin tube or other fluid passage (tubular body) climbs over these annular protrusion portions 16 so as to be mounted on the outer circumferential surface of the small diameter portion 4b, whereby the second tubular member 4 and the tubular body are connected with each other.

The first tubular member 2, which is the other of the two members constituting the female element, has a generally tubular shape. Described specifically, the first tubular member 2 has a first receiving portion 21 provided at the above-described one of its opposite end portions (the left-sided end portion as viewed in FIGS. 3 and 4), and a stop element in the form of a cylindrical portion 24 provided at the other of its opposite end portions, as shown in FIGS. 3–6. The first receiving portion 21 has an axial hole which is capable of receiving therein the annular protrusion portion 9 of the introduced end portion 8 of the pipe 6 (see FIG. 8). The cylindrical portion 24 has an inside diameter that is slightly larger than an outside diameter of the pipe 6 and is smaller than an outside diameter of the annular protrusion portion 9 of the pipe 6.

Upon introduction of the introduced end portion 8 of the pipe 6 into the axial hole of the first tubular member 2, as shown in FIG. 8, the annular protrusion portion 9 of the pipe 6 is brought into abutting contact with an annular surface 19 of the first tubular member 2, while the extreme end portion 8a of the pipe 6 is received in the large diameter portion 4a of the second tubular member 4. Owing to the abutting contact of the annular protrusion portion 9 of the pipe 6 with the annular surface 19, which is provided by an upstream-side end face of the cylindrical portion 24 as viewed in an introducing direction in which the pipe 6 is introduced into the female element, the pipe 6 is inhibited from being further moved in the introducing direction from an abutting-contact position in which the annular protrusion portion 9 is brought into contact with the annular surface 19. With the further movement of the pipe 6 in the introducing direction being thus inhibited, the tubular sealing member 10 fitted in the large diameter portion 4a of the second tubular member 4 is gripped by and between the inner circumferential surface of the large diameter portion 4a and the outer circumferential surface of the extreme end portion 8a of the pipe 6 that is introduced into the large diameter portion 4a.

The first tubular member 2 further has an annular flange portion 18 which protrudes radially outwardly from the outer circumferential surface of one of axially end portions of the cylindrical portion 24 that is closer to the annular surface 19 than the other of the axially end portions of the cylindrical portion 24. Four engaging arms 20 are formed integrally with the flange portion 18, such that the engaging arms 20 are equally spaced apart from each other in a circumferential direction of the first tubular member 2, and extend toward the second tubular member 4 from an outer peripheral portion of the flange portion 18. Each of the engaging arms 20 has, in its free end portion, an engaging claw 20a which protrudes radially inwardly from the free end portion.

The first and second tubular members 2, 4 are fixedly connected to each other, owing to the four engaging arms 20 in addition to the arrangement in which the cylindrical portion 24 of the first tubular member 2 is fitted into the entrance portion 13 of the large diameter portion 4a of the second tubular member 4, as shown in FIG. 1.

That is, the entrance portion 13 of the large-diameter portion 4a of the second tubular member 4 is fitted into an accommodating spacing 22 which is defined by and between the cylindrical portion 24 and the engaging arms 20 that is formed integrally with the flange portion 18 of the first tubular member 2, while the engaging claws 20a of the respective engaging arms 20 are brought into engagement with the outside engaging portion in the form of the annular groove 12 that is formed in the outer circumferential surface of the large-diameter portion 4a. Further, an annular engaging protrusion portion 24a, which is formed in the outer circumferential surface of the extreme end portion of the cylindrical portion 24, is brought into engagement with the inside engaging portion in the form of the annular groove 14 that is formed in the inner circumferential surface of the entrance portion 13 of the large-diameter portion 4a. With these engagements, the first and second tubular members 2, 4 are firmly connected to each other. As a result of this connection of the first and second tubular members 2, 4, the annular sealing member 10 that is fitted in the large-diameter portion 4a of the second tubular member 4 is brought into contact at its axially opposite end faces with the end face of the cylindrical portion 24 of the first tubular member 2 and the shoulder surface that connects the inner circumferential surfaces of the respective large and small diameter portions 4a, 4b of the second tubular member 4, whereby the sealing member 10 is held in a position between the end face of the cylindrical portion 24 and the shoulder face of the second tubular member 4.

Figure 3:
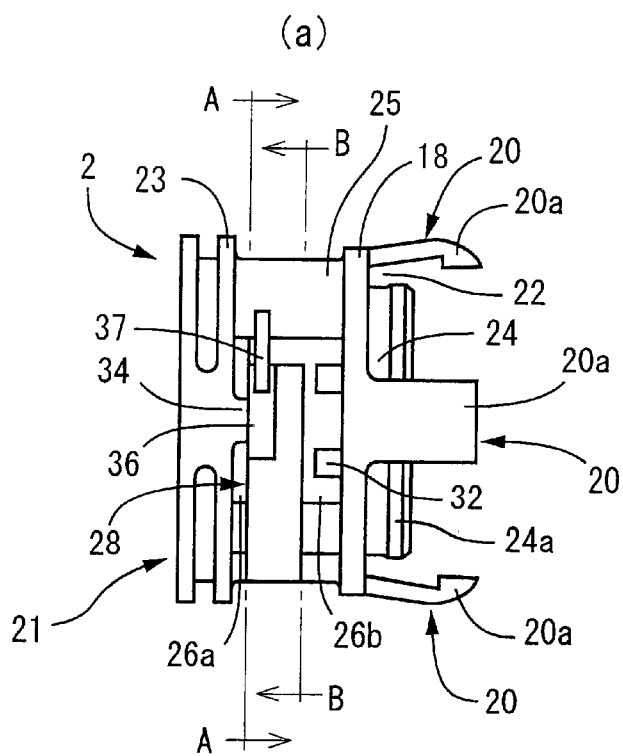
FIG. 3 are views showing a first tubular member which constitutes the female element of the quick connector of FIG. 1, wherein (a) is a front view of the first tubular member while (b) is a front view in cross section of the first tubular member.
Figure 3:
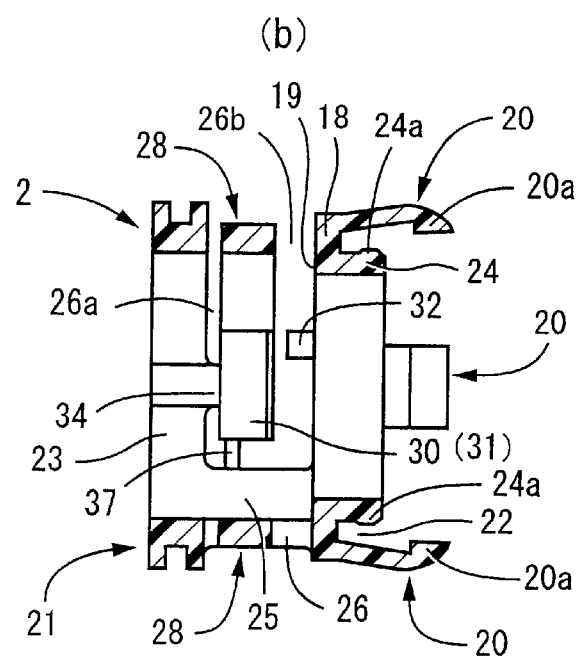
Figure 4:
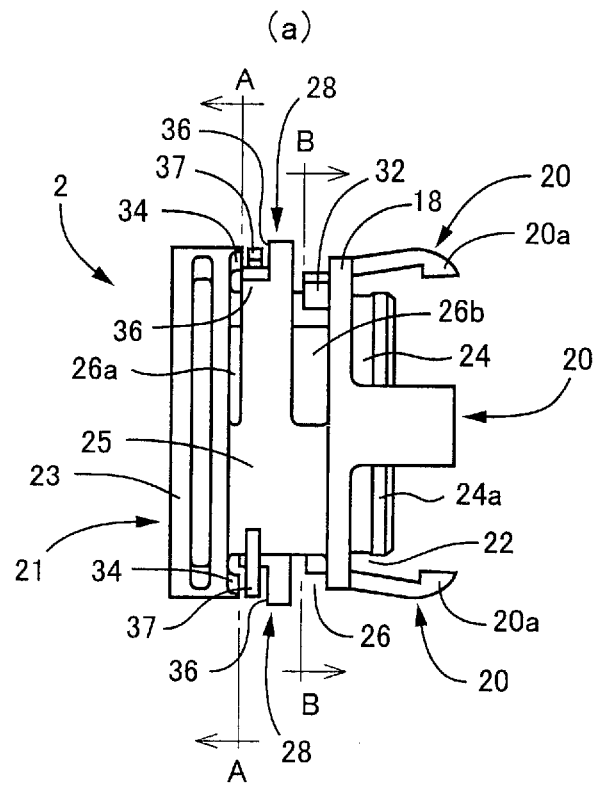
FIG. 4 are views showing the first tubular member which constitutes the female element,of the quick connector of FIG. 1, wherein (a) is a plan view of the first tubular member while (b) is a plan view in cross section of the first tubular member.
Figure 4:
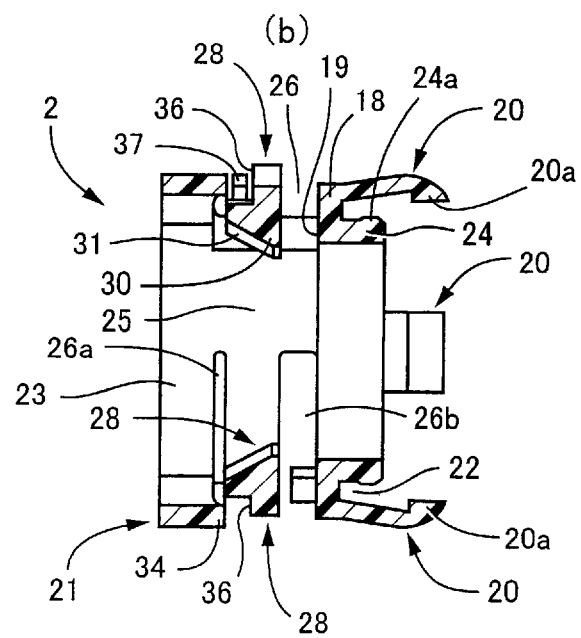
Figure 5:
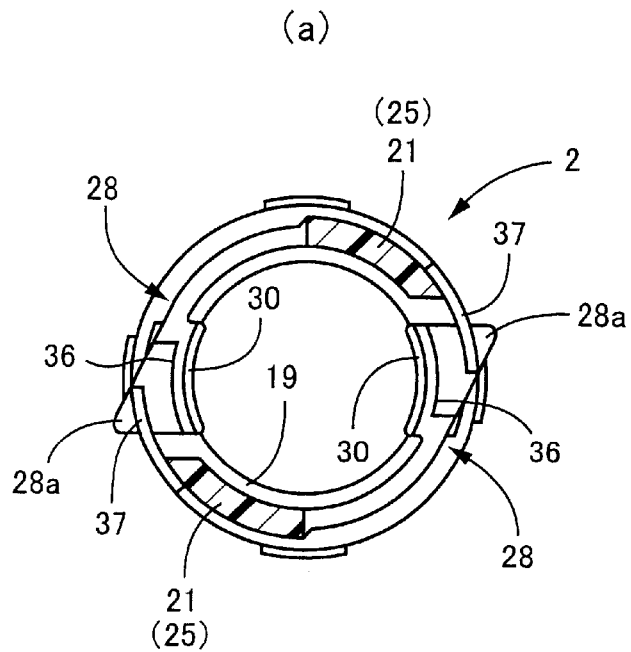
FIG. 5 are cross sectional views showing the first tubular member which constitutes the female element of the quick connector of FIG. 1, wherein (a) is a cross sectional view taken along line A—A of FIG. 3(a), while (b) is a cross sectional view taken along line B—B of FIG. 3(a).
Figure 5:
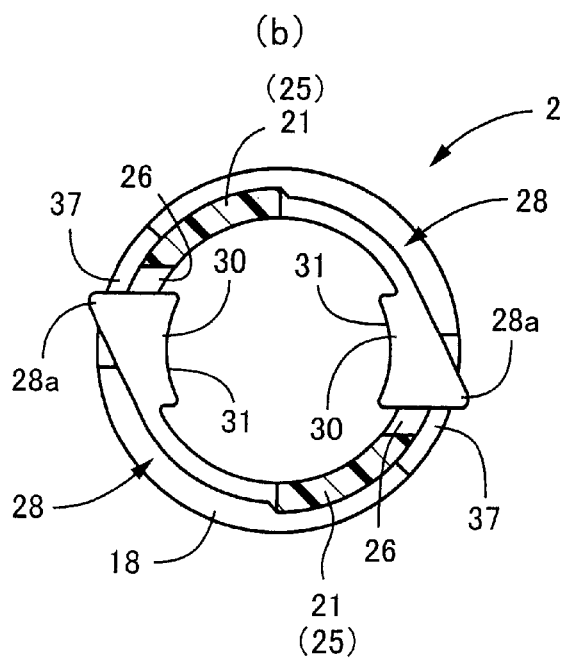

The two circumferentially-extending, elastically-deformable tongue portions 28 are formed integrally with the first receiving portion 21 of the first tubular member 2, by cutting through the cylindrical wall of the first receiving portion 21 such that the two tongue portions 28 are symmetrical with respect to the axis of the first tubular member 2, as shown in FIGS. 3–5. That is, each of the two tongue portions 28 is defined by a U-shaped slot 26 which is formed to circumferentially extend from a beam portion 25 which connects the cylindrical portion 24 with a pipe-introducing end portion 23 of the first receiving end portion 21, as is apparent from FIG. 4(a).

Each tongue portion 28 has, in an inner surface of its free end portion, an engaging protrusion portion 30 which inwardly protrudes. The engaging protrusion portion 30 has, in its radially inner end surface, a guide surface 31 serving to guide the annular protrusion portion 9 of the introduced pipe 6. The guide surface 31 is inclined in a manner that makes the tongue portion 28 be radially outwardly deformed upon abutting contact of this radially inner end surface with the annular protrusion portion 9 of the introduced pipe 6, as shown in FIG. 1, FIG. 4(b) and FIG. 5. In other words, the guide surface 31 of the engaging protrusion portion 30 has an inside diameter reducing as viewed in the introducing direction of the pipe 6, namely, a radial distance between the guide surface 31 and the axis of the first tubular member 2 reduces as viewed in the introducing direction of the pipe 6. It is noted that the elastic deformation of the tongue portion 28 is caused owing to resin spring characteristics of the resin material of which the first tubular member 2 is made.

The U-shaped slot 26, which is formed through the cylindrical wall portion of the first tubular member 2, includes first and second slot parts 26a, 26b which extend in the circumferential direction, as shown in FIGS. 1, 3 and 4, etc. The first slot part 26a is located between the pipe-introducing end portion 23 which provides a slot defining portion of the first receiving portion 21, and a side face of the tongue portion 28 which is opposed to the pipe-introducing end portion 23. The second slot part 26b is located between the annular surface 19 of the cylindrical portion 24 which provides another slot-defining portion of the first tubular member 2, and a side face of the tongue portion 28 which is opposed to the annular surface 19. The second slot part 26b has a width larger than that of the first slot part 26a. The width of the second slot part 26b is sufficiently large for accommodating therein the annular protrusion portion 9 of the pipe 6.

Figure 6:
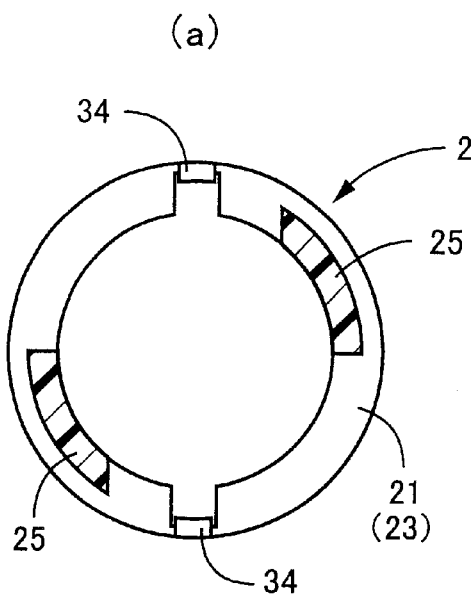
FIG. 6 are cross sectional views showing different cross sections of the first tubular member which constitutes the female element of the quick connector of FIG. 1, wherein (a) is a cross sectional view taken along line A—A of FIG. 4(a), while (b) is a cross sectional view taken along line B—B of FIG. 4(a).
Figure 6:
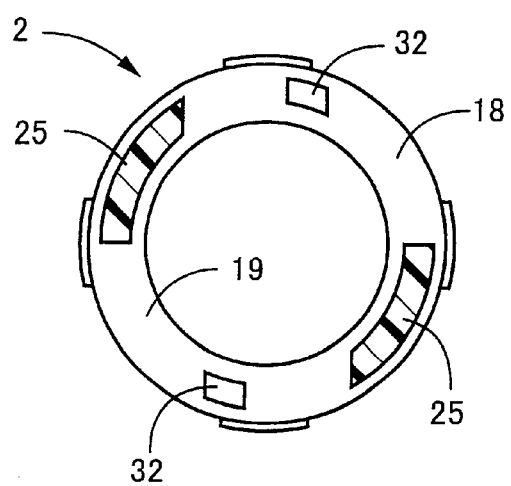
Figure 7:
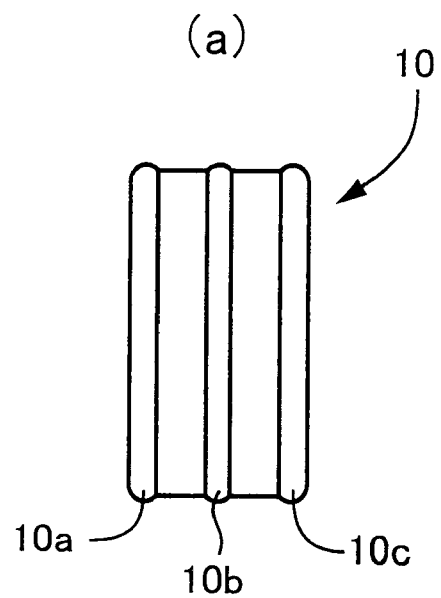
FIG. 7 are views explaining a sealing member used in the quick connector of FIG. 1, wherein (a) is a front view of the sealing member while (b) is an axially cross sectional view of the sealing member.
Figure 7:
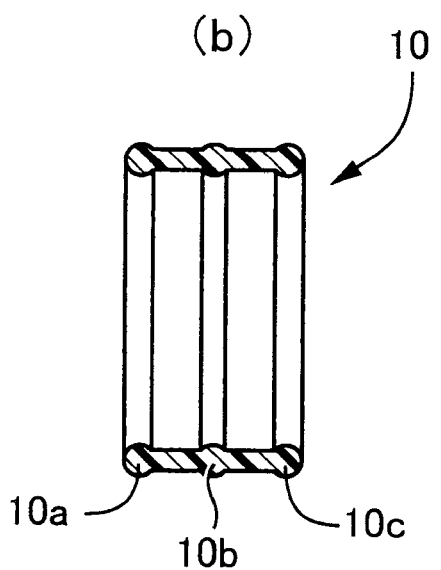

An excessive-deformation preventing protrusion 32 serving as a third restricting protrusion is integrally formed on the annular surface 19 of the cylindrical portion 24 of the first tubular member 2, so as to protrude into the second slot part 26b, as shown in FIGS. 3, 4(a) and 6, etc. This excessive-deformation preventing protrusion 32 is brought into contact with a portion of the side face of the tongue portion 28 that is located in the free end portion, the tongue portion 28 is pressed by the protrusion 32, for thereby limiting displacement of the free end portion of the tongue portion 28 as a result of the elastic deformation of the tongue portion 28 in the introducing direction of the pipe 6. That is, the excessive-deformation preventing protrusion 32 serves to inhibit excessive displacement of the free end portion of the tongue portion 28 in the introducing direction of the pipe 6, when the free end portion of the tongue portion 28 is forced by the annular protrusion portion 9 of the pipe 6 in the introducing direction of the pipe 6, upon introduction of the introduced end portion 8 of the pipe 6 into the axial hole of the first tubular member 2. This arrangement facilitates the annular protrusion portion 9 of the pipe 6 to climb over the engaging protrusion portion 30 of the tongue portion 28, whereby the annular protrusion portion 9 is reliably brought into engagement with the engaging protrusion portion 30 in a snap action manner.

A protrusion 34 serving as a first restricting protrusion is integrally formed on one of opposite side faces of the pipe-introducing end portion 23 which is closer to the tongue portion 28 than the other side face of the pipe-introducing end portion 23, and protrudes into the first slot part 26a, as is apparent from FIGS. 3 and 4, etc. A restricting recess portion 36 is formed in the free end portion of the tongue portion 28 that is opposed to the side face of the pipe-introducing end portion 23 on which the protrusion 34 is formed, so that the protrusion 34 is superposed on the restricting recess portion 36 in the radial direction so as to be brought into engagement with the recess portion 36, when the tongue portion 28 is forced by the annular protrusion portion 9 of the pipe 6 to be elastically deformed in a direction that causes the pipe 6 to be pulled out of the female element, upon application of a pulling force between the pipe 6 and the female element.

This arrangement permits the protrusion 34 and the restricting recess portion 36 to be radially superposed on each other and then brought into engagement with each other, normally when the pulling force generated by, e.g. a fluid pressure is applied between the pipe 6 and the female element. The engagement of the protrusion 34 with the recess portion 36 prevents the tongue portion 28 from being radially outwardly deformed, thereby consequently making it possible to firmly maintain the engagement of the engaging protrusion portion 30 of the tongue portion 28 with the annular protrusion portion 9 of the pipe 6.

A stop protrusion 37 serving as a second restricting protrusion is integrally formed on a portion of each beam portion 25 of the first tubular member 2 which portion is opposed to an extreme end of the free end portion of the tongue portion 28, and protrudes toward the free end portion of the tongue portion 28, as shown in FIGS. 3 and 4, etc. The stop protrusion 37 is positioned to be opposed to the above-described restricting recess portion 36 which is formed in the free end portion of the tongue portion 28, in the radial direction with a predetermined radial spacing distance therebetween, so that the stop protrusion 37 is brought into engagement with a bottom face of the restricting recess portion 36 which is formed in the free end portion of the tongue portion 28 when the tongue portion 28 is deformed outwardly in the radial direction, as is apparent from FIG. 5(a). Therefore, this arrangement inhibits the tongue portion 28 from being deformed excessively in the radially outward direction, in an operation for releasing the snap engagement of the engaging protrusion portion 30 of the tongue portion 28 with the annular protrusion portion 9 of the pipe 6, by operating an operating portion 28a provided in the free end portion of the tongue portion 28. In the present embodiment, the single recess portion 36 is adapted to serve as a restricting recess portion which is brought into engagement with both of the two restricting protrusions 34, 37.

The annular sealing member 10, which is brought into close contact at its outer peripheral portion with the inner circumferential surface of the large diameter portion 4a of the second tubular member 4, has a cylindrical shape which has a predetermined axial length, as shown in FIGS. 7(a) and (b). Three circumferentially-extending, ring-shaped swelling portions 10a, 10b, 10c are integrally formed on respective three portions, i.e., axially opposite end portions and an axially intermediate portion of the sealing member 10. In other words, the sealing member 10 consists of the three ring-shaped swelling portions 10a, 10b, 10c each having a circular cross section, and two thin cylindrical walls one of which connects the swelling portions 10a and 10b and the other one of which connects the swelling portions 10b and 10c. These swelling portions 10a, 10b, 10c constitute a sealing portion of the sealing member 10.

Therefore, the first tubular member 2 and the second tubular member 2, 4 can be easily assembled into the female element having the construction as shown in FIG. 1, by engaging the engaging claw 20a of the first tubular member 2 with the outside annular groove 12 of the second tubular member 4. Further, in the thus assembled female element, the pipe 6 can be held without a member which is mounted onto or introduced into the first tubular member 2, thereby minimizing the diameter and the axial length of the female element and advantageously making the entirety of the quick connector compact in size.

Since the female element consists of the two members, i.e., the first and second tubular members 2, 4, it is possible to advantageously form each of the two tubular members 2, 4 by using a mold having a construction which facilitates an injection molding operation. Further, it is possible to easily introduce the sealing member 10 into the second tubular member 4 through one of opposite ends of the second tubular member 4, and accordingly easily replace the sealing member 10 with another one.

Further, in the above-illustrated embodiment, the cylindrical portion 24 serving as the stop element is formed integrally with the first tubular member 2. This arrangement permits the sealing member 10 to be held by and between the end face of the cylindrical portion 24 of the first tubular member 2 and the inner shoulder surface of the second tubular member 4, by connecting the first and second tubular members 2, 4 to each other, without provision of a bushing member which has been conventionally used to exclusively hold the sealing member in position. Thus, it is no longer necessary to prepare such a bushing member, eliminating a conventionally required operation for fitting such a bushing member in a predetermined position, whereby the number of the required components and the assembling operation are reduced and remarkably simplified, respectively.

Still further, in the above-illustrated embodiment, the first and second tubular members 2, 4 are connected to each other, with the engagement of the engaging claw 20a with the outside annular groove 12, and also the engagement of the swelling portion formed in the outer circumferential surface of the cylindrical portion 24 with the inside annular groove 14 formed in the inner circumferential surface of the second tubular member 4. That is, the first tubular member 2 is fixedly engaged with the outer and inner surfaces of the axial end portion of the second tubular member 4 by the two engagements, whereby the two tubular members 2, 4 are firmly connected to each other.

Into the female element constituted by the first and second tubular members 2, 4 which are connected with each other as shown in FIG. 1, the pipe 6 is introduced through one of the opposite opening ends which is provided in the first tubular member 2, so that the pipe 6 is connected to the female element, as shown in FIG. 8.

That is, the pipe 6 is introduced into the axial hole of the first tubular member 2, as shown in FIG. 1. With advancement of the pipe 6 in the introducing direction, the annular protrusion portion 9 of the pipe 6 is brought into abutting contact with the engaging protrusion portion 30 of each of the tongue portions 28. With further advancement of the pipe 6, the annular protrusion portion 9 forces the inclined guide surface of the engaging protrusion portion 30 outwardly in the radial direction, whereby the engaging protrusion portion 30 is displaced outwardly in the radial direction, as shown FIG. 9(b), thereby permitting the annular protrusion portion 9 to climb over the engaging protrusion portion 30. After the annular protrusion portion 9 has climbed over the engaging protrusion portion 30, the annular protrusion portion 9 of the pipe 6 is accommodated into the second slot part 26b of the slot 26 of the first tubular member 2, so that the pipe 6 is fixedly held in a predetermined position relative to the female element, as shown in FIG. 8 and FIG. 9(a). After the annular protrusion portion 9 of the pipe 6 has been accommodated into the second slot part 26b of the slot 26, the pipe 6 is inhibited, by abutting contact of the annular protrusion 9 with the radially-extending annular surface 19 of the flange portion 18 of the cylindrical portion 24 of the first tubular member 2, from further advancing in the introducing direction even if the pipe 6 is forced in the rightward direction relative to the female element, as viewed in FIG. 8. Similarly, the pipe 6 is inhibited, by engagement of the annular protrusion 9 with the engaging protrusion portion 30 of the tongue portion 28, from moving in the leftward direction and being pulled out of the female element, even if the pipe 6 is forced in the leftward direction relative to the female element, as viewed in FIG. 8.

When the pipe 6 is thus fixed to the first tubular member 2 of the quick connector, the extreme end portion 8a of the pipe 6 is positioned on one of axially opposite sides of the cylindrical portion 24 of the first tubular member 2 which is closer to the second tubular member 4 than the other of the axially opposite sides of the cylindrical portion 24, namely, the extreme end portion 8a of the pipe 6 having passed through the cylindrical portion 24 protrudes into the second tubular member 4. The extreme end portion 8a of the pipe 6 thus protruding into the second tubular member 4 is fitted in the annular sealing member 10, for thereby providing a fluid tightness between the pipe 6 and the female element (the second tubular element 4).

The annular sealing member 10, which is used for proving the fluid tightness between the pipe 6 and the female element, has the three swelling portions 10a, 10b, 10c which are positioned in the respective positions spaced apart from each other in the axial direction, as shown in FIGS. 7(a) and (b). Thus, engaging pressure generated by elastic deformations of the respective annular protrusions 10a, 10b, 10c acts on a plurality of axial portions of the outer circumferential surface of the pipe 6 which portions are spaced apart from each other in the axial direction, thereby providing a further improved sealing effect between the pipe 6 and the female element.

In the operation for connecting the female element and the pipe (male element) 6, each of the tongue portions 28 of the first tubular member 2 constituting the female element is forced by the annular protrusion portion 9 in the rightward direction as seen in FIG. 8. In the illustrated embodiment, in which the protrusion 32 is provided on the annular surface 19 of the cylindrical portion 24 so as to protrude into the second slot part 26b, the abutting contact of the tongue portion 28 with the protrusion 32 serves to limit deformation of the tongue portion 28 in the introducing direction of the pipe 6. Thus, the second slot part 26b can have a width large enough to accommodate therein the annular protrusion portion 9 of the pipe 6, thereby assuring a reliable snap-action-manner engagement.

The female element and the pipe 6 can be disconnected from each other, by using, for example, a releasing tool having a tubular body having a slit formed therein, so that the pipe 6 is pulled out of the female element while the tongue portions 28 are kept to be displaced outwardly in the radial direction. The thus disconnected female element and the pipe 6 can be connected to each other again, as needed. It is to be understood that the connection of the pipe (male element) 6 and the female element can be released without using the releasing tool, owing to the provision of the operating portion 28a in the quick connector of the present embodiment. The operating portion 28a is provided on the radially outer portion of the free end portion of each tongue portion 28, and protrudes outwardly in the radial direction. The operating portion 28a has a radially outer end which is positioned radially outwardly of the outer circumferential surface of the first tubular member 2. That is, it is possible to release the connection of the pipe (male element) 6 and the female element can. be released by operatively pulling the pulling the operating portion 28a outwardly in the radial direction, without using the releasing tool.

In the present embodiment, when the free end portion of each tongue portion 28 is displaced in a direction that causes the pipe 6 (male element) to be pulled out of the female element, upon application of a pulling force to the pipe 6 which has been connected to the female element, the upward-displacement preventing protrusion 34, which protrudes from the side face of the pipe-introducing end portion 23 of the first tubular member 2 into the first slot part 26a, is radially superposed on the restricting recess portion 36 of the tongue portion 28 so as to be brought into engagement with the restricting recess portion 36, thereby inhibiting the tongue portion 28 from being radially outwardly deformed and accordingly preventing easy removal of the pipe 6 from the female element.

In the operation for pulling the pipe 6 out of the female element, the operating top portion 28a is operated to be lifted up in the radially outward direction, without using the releasing tool, for releasing the connection between the pipe 6 and the female element.

In this instance, the tongue portion 28 is inhibited from being elastically deformed excessively in the radially outward direction, by the engagement of the stop protrusion 37 which is provided in the beam portion 25 of the first tubular member 2 so as to extend toward the free end portion of the tongue portion 28, with the restricting recess portion 36 which is provided in the free end portion of the tongue portion 28 so as to be radially superposed on the stop protrusions 37, as described above. Thus, this arrangement is effective to inhibit the tongue portion 28 from being excessively deformed in the radially outward direction, thereby effectively preventing the tongue portion 28 from being damaged or broken.

While the present invention has been specifically clarified based on the typical embodiment of the present invention, it is needless to say that the embodiment has been provided for illustrative purpose only and that present invention is not limited to the above descriptions.

Figure 10:
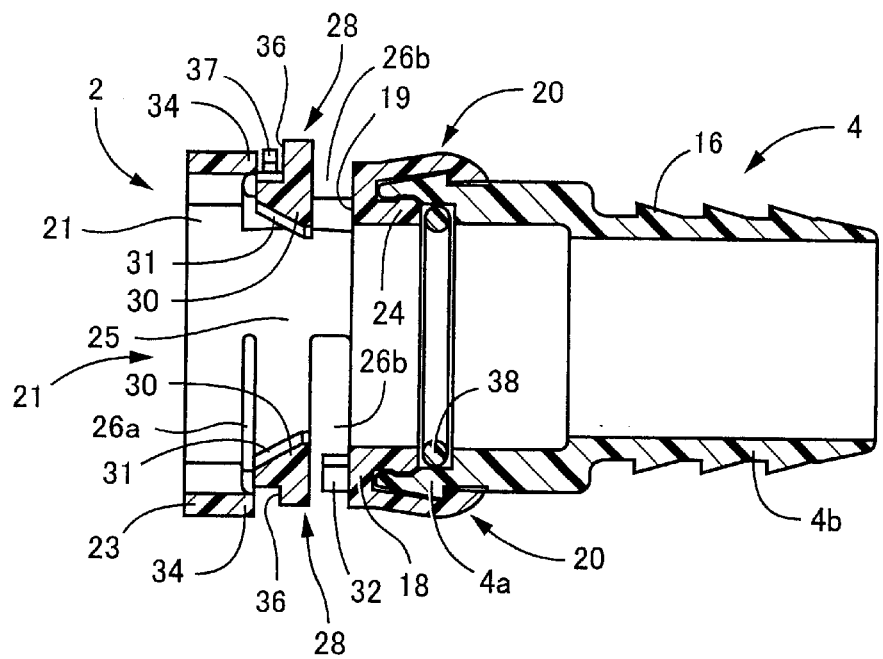
FIG. 10 is a cross sectional view corresponding to that of FIG. 1, and showing another example of the quick connector having a sealing member different from that of the quick connector of FIG. 1.

For example, while the sealing member 10 having the tubular shape is used in the above-described embodiment, the tubular-shaped sealing member 10 may be replaced by an O-ring 38 having a circular cross section as shown in FIG. 10. A plurality of O-rings each of which is similar to the O-ring 38 may be provided, for example, so as to be arranged in the axial direction. Further, the presence of the cylindrical portion 24, which serves as a seal stop portion, is not essential. In place of the presence of the cylindrical portion 24, the annular portion 18 of the first tubular member 2 may extend inwardly in the radial direction so as to have a radially inner end portion which is positioned radially inwardly of the inner circumferential surface of the large diameter portion 4a of the second tubular member 4 in which surface the sealing member (10, 38) is fitted. In this case, the radially inner end portion of the annular portion 18 can serve as the seal-stop portion so as to be abuttable on the sealing member (10, 38) for preventing movement of the sealing member (10, 38) and accordingly holding the sealing member (10, 38) in position.

In the above-described embodiment, the first and second tubular members 2, 4 are connected with each other by connecting means which is provided by with the engagement of the engaging claw 20a with the outside annular groove 12, and the engagement of the engaging protrusion portion 24a of the cylindrical portion 24 with the inside annular groove 14. That is, the two tubular members 2, 4 are connected by the two engagements, for facilitating the connecting operation. However, the two tubular members 2, 4 may be connected by only one of the two engagements. Further, the connecting means may be provided by other type of means. For example, the two tubular members 2, 4 may be connected, by press-fitting the cylindrical portion 24 into the entrance portion 13 of the large diameter portion 4a, or by welding. the two portions 24, 13 to each other, or by bonding the two portions 24, 13 with a suitable adhesive. Still further, where the first tubular member 2 include the radially inward flange portion provided in the connecting axial end portion at which the first tubular member 2 is connected to the second tubular member 4 and which is brought in contact at its inner peripheral portion with the sealing member for holding the sealing member, an outer peripheral portion of the radially inward flange can be utilized to be bonded to an end face of the connecting axial end portion of the second tubular member 4 by a suitable welding, so that the two tubular members 2, 4 are connected to each other, although this arrangement is not shown in the figures.

Figure 11:
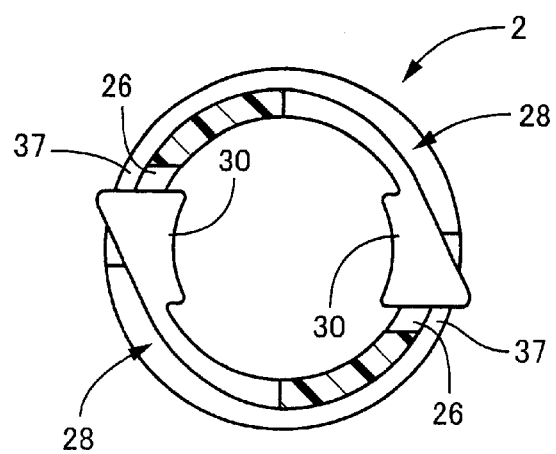
FIG. 11 is a view corresponding to that of FIG. 5(b), and showing another example of the tongue portion provided in the first tubular member which constitutes the female element of the quick connector.
Figure 12:
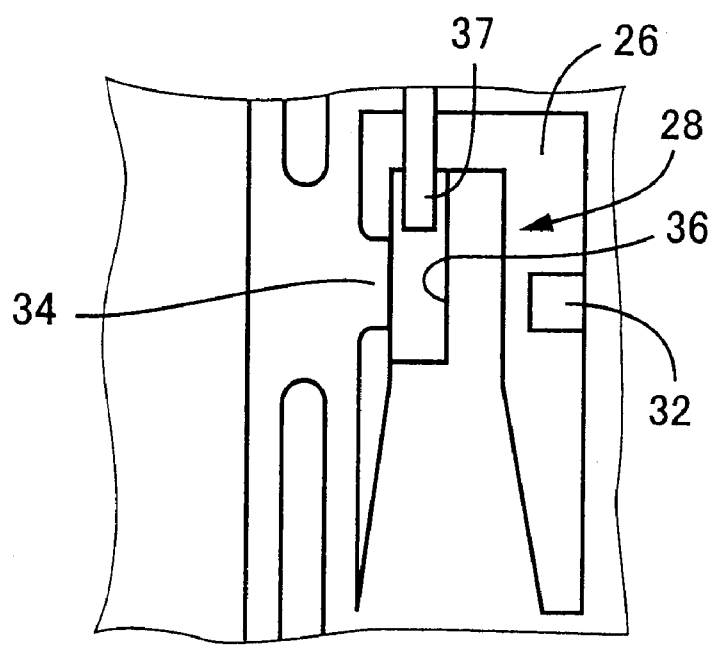
FIG. 12 is a flat view showing a still another example of the tongue portion provided in the first tubular member which constitutes the female element of the quick connector.

The shape, arrangement and number of the tongue portions 28 of the first tubular member 2 also may be suitably modified. For example, while each of the tongue portions 28 is defined by the U-shaped slot 26 in the above-described embodiment, each tongue portion may be formed by cutting through the cylindrical wall of the first receiving portion 21 of the first tubular member 2 in a L-shaped manner. Each tongue portion 28 may have a thickness which is constant as the tongue portion 28 extends toward its distal free end portion, or alternatively may have a thickness which gradually reduces as the tongue portion 28 extends toward its distal free end portion away from its proximal end portion at which the tongue portion 28 is connected to the cylindrical wall of the first tubular member 2, as shown in FIG. 11. This gradual reduction in the thickness of the tongue portion 28 is effective to prevent a local stress concentration in the proximal end portion of the tongue portion 28 and accordingly protect or inhibit the tongue portion 28 from being broken, for example, when the tongue portion 28 is radially outwardly forced by the annular protrusion 9 of the pipe 6 in the operation for introducing the pipe 6 into the female element. Further, each tongue portion 28 may have a width which gradually reduces as the tongue portion 28 extends toward its distal free end portion away from its proximal end portion, as shown in FIG. 12. This gradual reduction in the width of the tongue portion 28 provides the similar effect as the gradual reduction in the thickness. It is noted that both of the thickness and the width of the tongue portion 28 may reduce as the tongue portion 28 extends toward its distal free end portion away from its proximal end portion, so that the above-described effect is more advantageously provided.

While the quick connector is of a straight type in the above-illustrated embodiment, the quick connector may be of an elbow type so as to have a generally L shape. In this case, the second tubular member 4 may have a L-shaped bent part in an intermediate portion of the small diameter portion 4b.

The excessive-deformation-preventing protrusion 32 may be provided in the side face of the tongue portion 28, although this arrangement is not shown in the figures. Further, the respective positions of the upward-displacement preventing protrusion 34 and the restricting recess portion 36 in the above-illustrated embodiment may be modified such that the protrusion 34 and the recess portion 36 may be provided in the side face of the tongue portion 28 and in the side face of the ring-shaped introducing end portion 23 of the first tubular member 2, respectively, although this modified arrangement is not shown in the figures, either.

The engaging protrusion portion 30, which is formed in he inner face of the free end portion of the tongue portion 28, also may be modified. In the above-illustrated embodiment, the engaging protrusion portion 30 is provided with the guide surface 31 consisting of the inclined surface which facilitates the annular protrusion portion 9 of the introduced pipe 6 to climb over the engaging protrusion portion 30. However, the engaging protrusion portion. 30 does not have to be provided with the inclined guide surface 31 and may be merely chamfered in its end portion, where the inclined guide surface 31 is formed in the annular protrusion portion 9 of the pipe 6.

The position of the stop protrusion 37 is not limited to that in the above-described embodiment, but may be changed such that the stop protrusion 37 may be provided in a side face of the slot defining portion which is positioned to surround the free end portion 28. Further, the stop protrusion 37 may be provided in the beam portion 25, the annular surface 19 of the cylindrical portion 24, or the side face of the pipe-introducing end portion 23.

Figure 13:
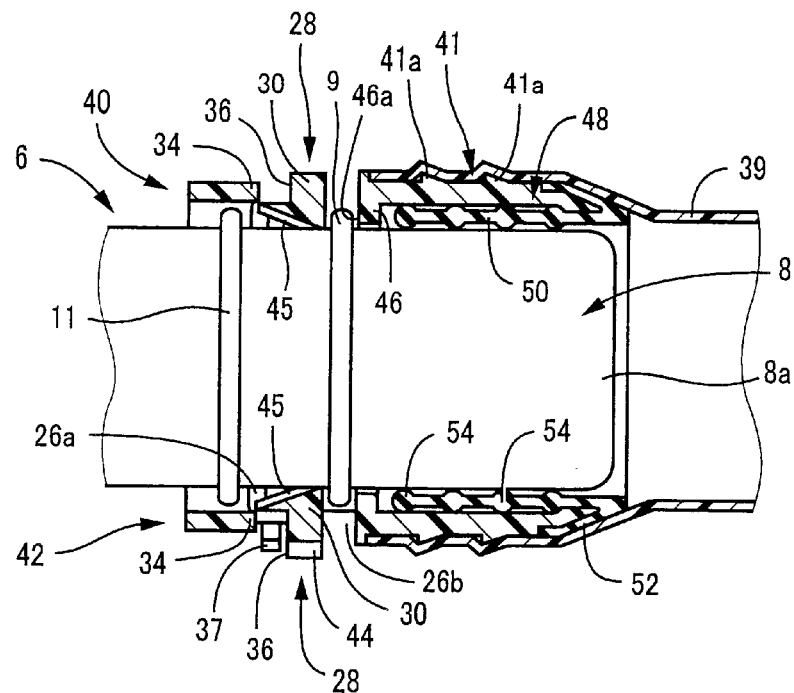
FIG. 13 is a view in cross section showing still another example of the quick connector which is constructed according to the present invention and which is different from the quick connector of FIG. 1.
Figure 14:
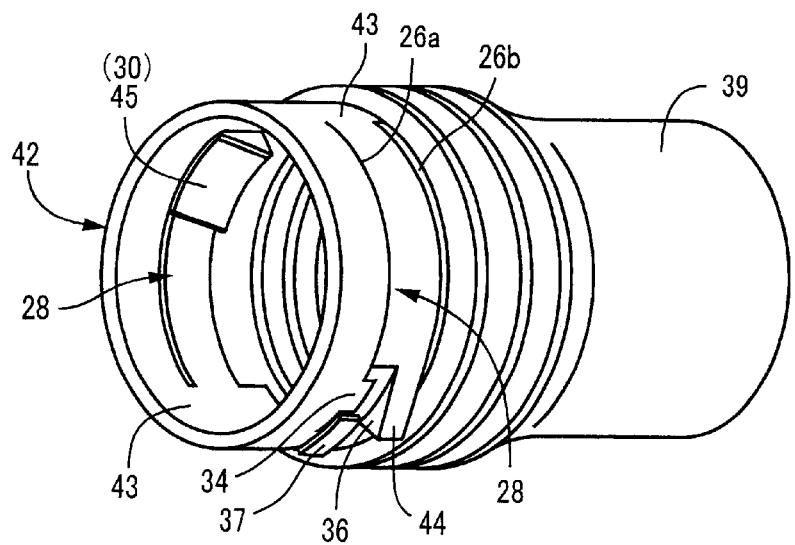
FIG. 14 is a perspective view of the quick connector of FIG. 13 and a resin tube which is connected to the female element of the quick connector.
Figure 15:
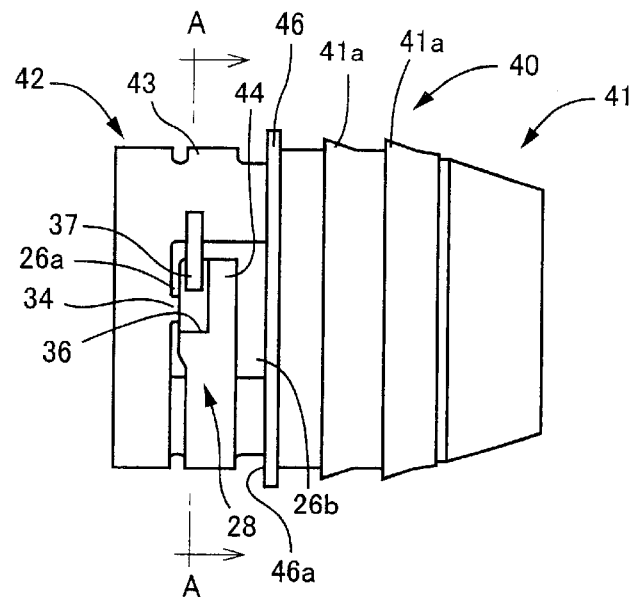
FIG. 15 is a front elevational view of the female element of the quick connector of FIG. 13.
Figure 16:
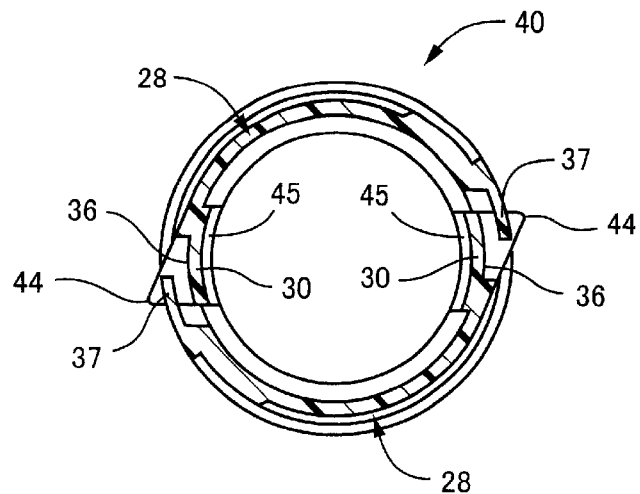
FIG. 16 is a cross sectional view taken along line A—A of FIG. 15.
Figure 17:
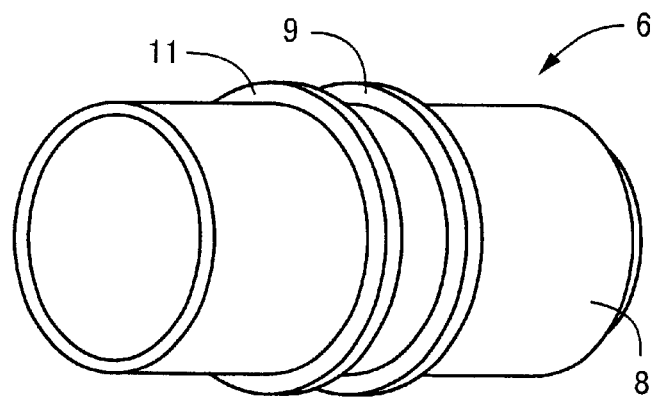
FIG. 17 is a perspective view of the male element which is introduced into the female element of the quick connector of FIG. 13.

In the quick connector of the above-described embodiment;. the female element is provided by the first and second tubular members 2, 4 which are connected to each other. However, the female element may be provided by a single tubular member, as schematically shown in FIG. 13 by way of example. In this FIG. 13 and FIGS. 14–19 which will be described below, the same reference numerals as used in the above-described embodiment will be used to identify the elements which are similar to those in the above- described embodiment. No redundant description of these elements will be provided.

The quick connector shown in FIG. 13 consists of a female element 40 provided by a single piece which is formed of a thermosetting resin material through a molding operation, and the pipe 6 which is quickly introduced into an axial hole of one of opposite end portions of the female element 40. The other of the opposite end portions of the female element 40 is configured such that a resin tube 39 can be fitted onto the other end portion so as to be fixed to the female element 40.

Described more specifically, as shown in FIGS. 13–16, the female element 40 has the axial hole which extends from one of its opposite ends toward the other of the opposite ends, and into which the introduced end portion 8 of the pipe 6 is introduceable through an opening of the axial hole that is open in the above-described one of the opposite ends of the female element 40. The female element 40 has, in the above-described one of the end portions, a first receiving portion 42 which has a tubular shape configured to receive therein the annular protrusion portion 9 of the pipe 6. The female element 40 further has, in the above-described other of the end portions, a second receiving portion 41 into which the extreme end portion 8a of the pipe 6 protrudes. Between the first and second receiving portions 42, 41, there is integrally formed an annular flange portion 46 which serves as a stop element. The annular flange portion 46 extends inwardly in the radial direction so as to have an inside diameter which is slightly larger than the outside diameter of the extreme end portion 8a of the pipe 6.

The plurality of circumferentially-extending, elastically-deformable tongue portions 28 are provided in the first receiving portion 42. Each of the tongue portions 28 is defined by the slot 26 which is formed through the cylindrical wall of the first receiving portion 42 and which extends in a U-shaped manner from the corresponding one of two beam portions 43. The two beam portions 43 consist of respective parts of the cylindrical wall of the first receiving portion 42 so as to be located on the same circle, and extend in the axial direction of the female element 40. The two beam portions 43 are spaced apart from each other by a predetermined spacing distance in the circumferential direction of the female element 40. Each tongue portion 28 extends from the corresponding one of the beam portions 43 toward the other one of the beam portions 43 in the circumferential direction over a distance not larger than the above-described predetermined spacing distance. Each tongue portion 28 has, in its free end portion, the engaging protrusion portion 30 which protrudes inwardly in the radial direction so as to be brought into engagement with the annular protrusion portion 9 of the pipe 6 in a snap action manner. The engaging protrusion portion 30 has, in its radially inner surface, a tapered guide surface 45 whose diameter gradually reduces as viewed in a direction in which the pipe 6 is introduced into the axial hole of the female element 40. The engaging protrusion portion 30 has, in its radially outer surface, an operational top portion 44 which protrudes outwardly in the radial direction. The operational top portion 44 has a radially outer end which is positioned radially outwardly of the outer circumferential surface of the first receiving portion 42.

The flange portion 46 has, in one of its opposite end faces which is closer to the first receiving portion 42 than the other of the opposite end faces, an annular surface 46a which is brought into abutting contact with the annular protrusion portion 9 of the pipe 6 upon introduction of the introduced end portion 8 of the pipe 6 into the axial hole of the female element 40, for thereby inhibiting further movement of the pipe 6 relative to the female element 40 in the introducing direction. On the outer circumferential surface of the second receiving portion 41, there are provided a plurality of annular protrusions 41a each of which has a tapered surface, in the interest of reducing the axial length of the female element 40. The second receiving portion 41 serves as a fitting end portion to which the resin tube 39 is to be connected.

The tubular pipe 6 is introduced into the axial hole of the first receiving portion 42 of the female element 40, while the resin tube 39 is fixed onto the outer circumferential surface of the second receiving portion 41 of the female element 40. In the introduction of the pipe 6 into the axial hole of the first receiving portion 42, the annular protrusion portion 9 provided on the outer circumferential surface of the introduced end portion 8 of the pipe 6 is first brought into abutting contact with the tapered guide surface 45 of the engaging protrusion portion 30 so as to force the engaging protrusion portion 30 outwardly in the radial direction. With the radially outward displacement of the engaging protrusion portion 30, the annular protrusion portion 9 of the pipe 6 is permitted to pass through over the engaging protrusion portion 30 so as to be then fitted into the second slot part 26b of the slot 26. The tongue portion 28 is restored to its original shape at the same time when the annular protrusion portion 9 is fitted into the second slot part 26b, and the engaging protrusion portion 30 is displaced inwardly in the radial direction so as to be brought into engagement with the annular protrusion portion 9 of the pipe 6 in a snap action manner.

An axial movement of the pipe 6 thus engaged with the female element 40 is limited by the fitting of the annular protrusion portion 9 of the pipe 6 into the second slot part 26b. The pipe 6 may includes a second annular protrusion portion 11 in addition to the annular protrusion portion 9 as a first annular protrusion portion, as shown in FIGS. 13–17. The second annular protrusion portion 11 is located on the rear side of the first annular protrusion portion 9 as viewed in the direction in which the pipe 6 is introduced into the female element 40. The second annular protrusion portion 11 may be positioned so as to be brought into contact with the inner circumferential surface of the axial hole of the first receiving portion 42 of the female element 40, so that the second annular protrusion portion 11 cooperates with the above-described flange portion 46 so as to minimize a radial backlash between the female element 40 and the pipe 6 which is introduced into the female element 40.

In the present embodiment, the engaging protrusion portion 30, which protrudes radially inwardly from the inner circumferential surface of the free end portion of the tongue portion 28, has the inner surface provided by the tapered guide surface 45, for permitting the engaging protrusion portion 30 of the female element 40 to be displaced radially outwardly, so that the annular protrusion portion 9 of the pipe 6 can be easily introduced into the female element 40. However, it is also possible to form a tapered guide surface in an end face of the annular protrusion portion 9 formed in the outer circumferential surface of the introduced end portion 8 of the pipe 6.

In the female element 40 of the present embodiment, the tongue portions 28 each serving as a retainer for retaining the pipe 6 are integrally formed, and each tongue portion 28 is deformable principally in the radial direction which is perpendicular to the axial direction of the female element 40. This arrangement cooperates with the above-described arrangement, in which the female element 40 is adapted to be connected at the second receiving portion 41 to the resin tube 39, for further reducing the axial length of the female element 40.

In the present female element 40, as show in FIGS. 13–16, the upward-displacement preventing protrusion 34, which protrudes into the first slot part 26a, is formed on the side face of the first receiving portion 42 which is opposed to the tongue portion 28. The restricting. recess portion 36, which is radially superposed on the upward-displacement preventing protrusion 34 so as to be brought into engagement with the protrusion 34 upon application of a pulling force between the pipe 6 and the female element 40, is provided in the free end portion of the tongue portion 28. In this arrangement, even when the pulling force acts on the tongue portion 28, the engagement of the engaging protrusion portion 30 of the female element 40 with the annular protrusion portion 9 of the pipe 6 is firmly maintained, thereby making it possible to effectively preventing the pipe 6 from being easily pulled out of the female element 40. It is noted that the upward-displacement preventing protrusion 34 may be provided in the free end portion of the tongue portion 28, for limiting the radially outward deformation of the tongue portion 28.

As in the above-described embodiment, in the present female element 40, the stop protrusion 37 is provided to protrude from the slot defining portion of the first receiving portion 42 that is opposed to the free end portion of the tongue portion 28, so as to be opposed to the bottom surface of the restricting recess portion 36 which is provided in the tongue portion 28, as shown in FIGS. 13–16, so that the stop protrusion 37. is brought into engagement with the bottom surface of the restricting recess portion 36 when the tongue portion 28 is made elastically deformed outwardly in the radial direction. Owing to this arrangement, it is possible to inhibit the tongue portion 28 from being excessively deformed outwardly in the radial direction, when the engagement of the engaging protrusion portion 30 of the tongue portion 28 with the annular protrusion portion 9 of the pipe 6 is released by operating the operational top portion 44.

In the present female element 40, a sealing member 48 is introduced into the second receiving portion 41 from one of opposite sides of the second receiving portion 41 which is remote from the first receiving portion 42, such that the sealing member 48 is brought into contact with the inner circumferential surface of the second receiving portion 41. The pipe 6 is introduced into the female element 40 such that the extreme end portion 8a of the introduced pipe 6 is brought into contact with the inner circumferential surface of the sealing member 48. Thus, the sealing member 48 provides a fluid-tightness between the extreme end portion 8a of the pipe 6 and the second receiving portion 41.

Figure 18:
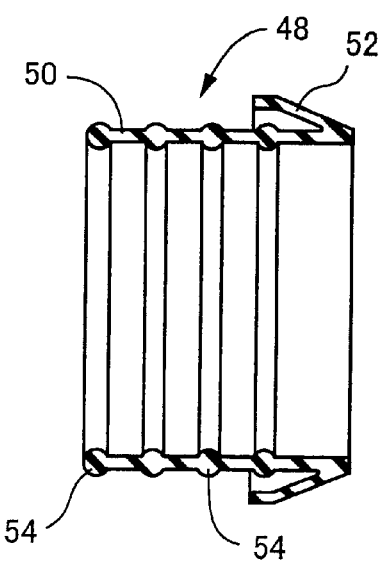
FIG. 18 is a view in cross section of a sealing member which is used in the quick connector of FIG. 13.

The sealing member 48 preferably has a shape configured to provide a fluid-tightness between the pipe 6 and the resin tube 39 in addition to that between the pipe 6 and the tubular body 41. The sealing member 48 has a cylindrical portion 50 and a folded portion 52 which extends obliquely from the periphery of an axial end of the cylindrical portion 50 toward the other axial end of the cylindrical portion 50. That is, the folded portion 52 extends in such a manner that the radial distance from the axis of the cylindrical portion 50 to the folded portion 52 increases as the folded portion 52 extends away from the axial end of the cylindrical portion 50 toward the other axial end of the cylindrical portion 50, as shown in FIG. 18. As shown in FIG. 13, the fluid tightness between the introduced end portion 8 of the pipe 6 and the inner circumferential surface of the second receiving portion 41 is provided by the arrangement in which the second receiving portion 41 is gripped at the periphery of the above-described one of its opposite end. portions by and between the cylindrical portion 50 and the folded portion 52 of the sealing member 48, namely, the cylindrical portion 50 of the sealing member 48 is fitted in the inner circumferential surface of the second receiving portion 41 while the folded portion 52 of the sealing member 48 is positioned to cover the outer periphery of the above-described one of the opposite side portions of the second receiving portion 41. The fluid tightness between the second receiving portion 41 and the resin tube 39 is provided by the arrangement in which the folded portion 52 of the sealing member 48 is interposed between the outer circumferential surface of the second receiving portion 41 and the resin tube 39.

The sealing member 48 further has a plurality of annular knot portions 54 which is provided in the cylindrical portion 50 and which are spaced apart from each other by a suitable spacing distance, for increasing a reliability of the fluid tightness between the tubular body 41 and the pipe 6. Each of the annular knot portions 54 has a cross sectional shape which does not have to be particularly limited but may be triangle, rectangular or circular as shown in FIG. 18. Since the sealing member 48 is gripped between the tubular body 41 and the pipe 6 and also between the tubular body 41 and the resin tube 39, whereby the sealing member 48 is prevented from being displaced, without using a bushing or collar which has been conventionally used for holding an O-ring or other sealing member in position, thereby making it possible to further reduce the number of the required components.

Figure 19:
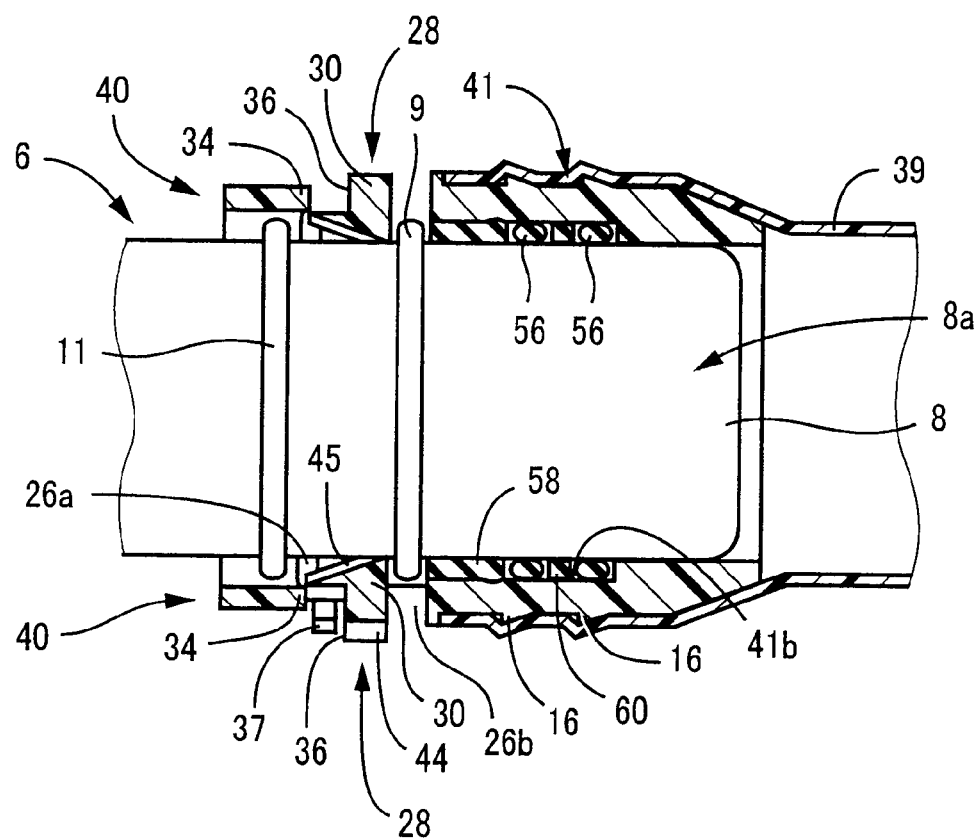
FIG. 19 is a cross sectional view corresponding to that of FIG. 13, and showing another example of the quick connector having a sealing member different from that of the quick connector of FIG. 13.

The sealing arrangement may be modified, as shown in FIG. 19, such that a shoulder surface 41b is formed in the inner circumferential surface of the second receiving portion 41, and such that the stop element in the form of a bushing 58 is provided to be fitted into the entrance portion of the second receiving portion 41 which is adjacent to the first receiving portion 42. Two O-rings 56, 56 as the annular sealing members for providing the fluid tightness between the pipe 6 and the second receiving portion 41, and a resin collar 60 interposed between the O-rings 56, 56 are provided to be fitted into an annular groove which is defined by the bushing 58 and the shoulder surface 41*b*.

In the present embodiment, when the pipe 6 requires to be removed from the female element 40, the operational top portion 44, which is provided to protrude from the outer circumferential surface of the free end portion of each tongue portion 28 of the female element 40, is pressed toward the corresponding beam portion 43 in the circumferential direction or in the obliquely upward direction. With the operational top portion 44 being thus pressed, the tongue portion 28 is elastically deformed in the radially outward direction, whereby the engaging protrusion portion 30 located in the opposite side (inner side) of the operational top portion 44 is displaced in the radially outward direction. The displacement of the engaging protrusion portion 30 in the radially outward direction releases the engagement of the engaging protrusion portion 30 with the annular protrusion portion 9, thereby making it possible to remove the pipe 6 out of the female element 40. In this instance, as described above, the engagement of the stop protrusion 37 with the restricting recess portion 36 of the tongue portion 28 prevents the tongue portion 28 from being excessively deformed in the radially outward direction, thereby effectively preventing the tongue portion 28 from being damaged or broken due to an excessive elastic deformation of the tongue portion 28.

The present invention may be embodied by suitably combining the above-illustrated embodiments, and may be embodied with various other changes, modifications and improvements, which may occur to those skilled in the art. It is to be understood that these embodied forms are included in the scope of the present invention as long as the embodied forms are not deviated from the sprit of the invention.

The quick connector according to the invention is capable of being more compact in its radial and longitudinal (axial) dimensions than a conventional quick connector, and improving an efficiency of assembling or production of the connector with a reduced cost, owing to the reduced number of the components of the connector.

Industrial Applicability

As is clear form the foregoing description, the present invention is capable of advantageously providing an improved quick connector which can be produced with a reduction in its entire size and improvements in the production efficiency and the economical performance.

What is claimed is:

1. A quick connector for providing a quick connection, characterized by comprising:

a tubular male element having an introduced end portion which straightly extends from an axial end of said tubular male element and which has an extreme end portion and an annular protrusion portion located on one of opposite sides of said extreme end portion that is remote from said axial end of said tubular male element;

a tubular female element having a first receiving portion and a second receiving portion which have respective tubular shapes configured to receive therein said annular protrusion portion and said extreme end portion of said introduced end portion, respectively, and;

an annular sealing member for assuring a fluid-tightness between said tubular male element and said tubular female element, wherein said first receiving portion extends from an axial end of said tubular female element toward the other axial end of said tubular female element, and has an axial hole into which said introduced end portion of said tubular male element is introduceable through an opening of said axial hole that is open in said axial end of said tubular female element;

wherein said second receiving portion is located on one of opposite sides of said first receiving portion that is closer to said other axial end of said tubular female element than the other of the opposite sides of said first receiving portion such that said first and second receiving portions have a coaxial relation with each other;

wherein said tubular female element has an annular stop element which is located at an axial end of the first receiving portion and which protrudes radially inwardly from an inner circumferential surface of said first receiving portion, said annular stop element having an inside diameter that is slightly larger than an outside diameter of said extreme end portion of said tubular male element, so that said annular stop element is opposed to said annular protrusion portion of said tubular male element so as to be brought into abutting-contact with said annular protrusion portion, for thereby limiting movement of said tubular male element toward said other axial end of said tubular female element away from said axial end of said tubular female element, when said introduced end portion of said tubular male element is introduced into said axial hole;

wherein said tubular female element has a plurality of tongue portions which are provided in said first receiving portion, each of said tongue portions being elastically deformable and extending in a circumferential direction of said tubular female element, so as to prevent removal of said tubular male element from said axial hole when said introduced end portion of said tubular male element is introduced into said axial hole;

wherein said first receiving portion has a plurality of beam portions which consist of respective parts of a cylindrical wall of said first receiving portion so as to be located on a same circle, and which extend in an axial direction of said tubular female element and are spaced apart from each other by a predetermined spacing distance in said circumferential direction of said tubular female element;

wherein each of said tongue portions is defined by a U-shaped slot which is formed through said cylindrical wall of said first receiving portion and which extends from the corresponding one of said beam portions, such that said tongue portion extends from said corresponding beam portion in said circumferential direction over a distance not larger than said predetermined spacing distance, and such that said tongue portion has a free end portion which is circumferentially opposite to a proximal end portion thereof at which said tongue portion is connected to said corresponding beam portion, said free end portion being displaceable at least in a radial direction of said tubular female element upon elastic deformation of said tongue portion;

wherein each of said tongue portions has, in said free end portion thereof, an engaging protrusion portion which protrudes inwardly in said radial direction so as to be brought into engagement with said annular protrusion portion of said introduced end portion of said tubular male element in a snap action manner;

wherein said engaging protrusion portion has, in an inner surface thereof, a guide surface whose diameter gradually reduces as viewed in a direction toward said other axial end of said tubular female element away from said axial end of said tubular female element; and wherein said sealing member is disposed on one of opposite sides of said annular stop element that is closer to said other axial end of said tubular female element than the other of the opposite sides of said annular stop element such that said sealing member is held in contact at an outer peripheral portion thereof with an inner circumferential surface of said second receiving portion, said sealing member being gripped between said extreme end portion of said tubular male element and said second receiving portion of said tubular female element when said introduced end portion of said tubular male element is introduced into said axial hole.

2. A quick connector for providing a quick connection, characterized by comprising:

a tubular male element having an introduced end portion which straightly extends from an axial end of said tubular male element and which has an extreme end portion and an annular protrusion portion located on one of opposite sides of said extreme end portion that is remote from said axial end of said tubular male element;

a tubular female element having a first receiving portion and a second receiving portion which have respective tubular shapes configured to receive therein said annular protrusion portion and said extreme end portion of said introduced end portion, respectively, and;

an annular sealing member for assuring a fluid-tightness between said tubular male element and said tubular female element, wherein said first receiving portion extends from an axial end of said tubular female element toward the other axial end of said tubular female element, and has an axial hole into which said introduced end portion of said tubular male element is introduceable through an opening of said axial hole that is open in said axial end of said tubular female element;

wherein said second receiving portion is located on one of opposite sides of said first receiving portion that is closer to said other axial end of said tubular female element than the other of the opposite sides of said first receiving portion such that said first and second receiving portions have a coaxial relation with each other;

wherein said tubular female element has an annular stop element which is located at an axial end of the first receiving portion and which protrudes radially inwardly from an inner circumferential surface of said first receiving portion, said annular stop element having a radially-extending annular surface and an inside diameter that is slightly larger than an outside diameter of said extreme end portion of said tubular male element, so that said radially-extending annular surface of said annular stop element is opposed to said annular protrusion portion of said tubular male element so as to be brought into abutting-contact with said annular protrusion portion, for thereby limiting movement of said tubular male element toward said other axial end of said tubular female element away from said axial end of said tubular female element, when said introduced end portion of said tubular male element is introduced into said axial hole;

wherein said tubular female element has a plurality of tongue portions which are provided in said first receiving portion, each of said tongue portions being elastically deformable and extending in a circumferential direction of said tubular female element, so as to prevent removal of said tubular male element from said axial hole when said introduced end portion of said tubular male element is introduced into said axial hole;

wherein said first receiving portion has a plurality of beam portions which consist of respective parts of a cylindrical wall of said first receiving portion so as to be located on a same circle, and which extend in an axial direction of said tubular female element and are spaced apart from each other by a predetermined spacing distance in said circumferential direction of said tubular female element;

wherein each of said tongue portions is defined by a U-shaped slot which is formed through said cylindrical wall of said first receiving portion and which extends from the corresponding one of said beam portions, such that said tongue portion extends from said corresponding beam portion in said circumferential direction over a distance not larger than said predetermined spacing distance, and such that said tongue portion has a free end portion which is circumferentially opposite to a proximal end portion thereof at which said tongue portion is connected to said corresponding beam portion, said free end portion being displaceable at least in a radial direction of said tubular female element upon elastic deformation of said tongue portion;

wherein each of said tongue portions has, in said free end portion thereof, an engaging protrusion portion which protrudes inwardly in said radial direction so as to be brought into engagement with said annular protrusion portion of said introduced end portion of said tubular male element in a snap action manner;

wherein said engaging protrusion portion has, in an inner surface thereof, a guide surface whose diameter gradually reduces as viewed in a direction toward said other axial end of said tubular female element away from said axial end of said tubular female element; and wherein said sealing member is disposed on one of opposite sides of said annular stop element that is closer to said other axial end of said tubular female element than the other of the opposite sides of said annular stop element such that said sealing member is held in contact at an outer peripheral portion thereof with an inner circumferential surface of said second receiving portion, said sealing member being gripped between said extreme end portion of said tubular male element and said second receiving portion of said tubular female element when said introduced end portion of said tubular male element is introduced into said axial hole.

3. A quick connector according to claim 1, wherein said annular sealing member consists of an O-ring.

4. A quick connector for providing a quick connection, comprising:

a tubular male element having an introduced end portion which straightly extends from an axial end of said tubular male element and which has an extreme end portion and an annular protrusion portion located on one of opposite sides of said extreme end portion that is remote from said axial end of said tubular male element; and a tubular female element having a first receiving portion and a second receiving portion which have respective tubular shapes configured to receive therein said annular protrusion portion and said extreme end portion of said introduced end portion, respectively;

wherein said first receiving portion extends from an axial end of said tubular female element toward the other axial end of said tubular female element, and has an axial hole into which said introduced end portion of said tubular male element is introduceable through an opening of said axial hole that is open in said axial end of said tubular female element;

wherein said second receiving portion is located on one of opposite sides of said first receiving portion that is closer to said other axial end of said tubular female element than the other of the opposite sides of said first receiving portion such that said first and second receiving portions have a coaxial relation with each other;

wherein said first receiving portion has a plurality of tongue portions each of which is elastically deformable and extends in a circumferential direction of said tubular female element, so as to prevent removal of said tubular male element from said axial hole when said introduced end portion of said tubular male element is introduced into said axial hole;

wherein said first receiving portion has a plurality of beam portions which consist of respective parts of a cylindrical wall of said first receiving portion so as to be located on a same circle, and which extend in an axial direction of said tubular female element and are spaced apart from each other by a predetermined spacing distance in said circumferential direction of said tubular female element;

wherein each of said tongue portions is defined by a U-shaped slot which is formed through said cylindrical wall of said first receiving portion and which extends from the corresponding one of said beam portions, such that said tongue portion extends from said corresponding beam portion in said circumferential direction over a distance not larger than said predetermined spacing distance, and such that said tongue portion has a free end portion which is circumferentially opposite to a proximal end portion thereof at which said tongue portion is connected to said corresponding beam portion, said free end portion being displaceable at least in a radial direction of said tubular female element upon elastic deformation of said tongue portion;

wherein each of said tongue portions has, in said free end portion thereof, an engaging protrusion portion which protrudes inwardly in said radial direction so as to be brought into engagement with said annular protrusion portion of said introduced end portion of said tubular male element in a snap action manner;

wherein said engaging protrusion portion has, in an inner surface thereof, a guide surface whose diameter gradually reduces as viewed in a direction toward said other axial end of said tubular female element away from said axial end of said tubular female element, wherein said U-shaped slot has a first slot part which is formed between a side face of said tongue portion that is closer to said axial end of said tubular female element than the other side face of said tongue portion, and a first slot defining face that is formed in said cylindrical wall of said first receiving portion and that is opposed to said side face of said tongue portion, said first slot part extending in said circumferential direction of said tubular female element;

wherein said tubular female element has a first restricting protrusion which is provided in one of said free end portion of said tongue portion and an opposed portion of said first slot defining face opposed to said free end portion, and which protrudes into said first slot part; and wherein said tubular female element has a first recess portion which is provided in the other of said free end portion of said tongue portion and said opposed portion of said first slot defining face, so that said first restricting protrusion is superposed on said first recess portion in said radial direction so as to be brought into engagement with said first recess portion, when said free end portion of said tongue portion is forced by said annular protrusion portion of said tubular male element to be displaced in a direction that causes said tubular male element to be pulled out of said tubular female element, upon application of a pulling force between said tubular male element and said tubular female element.

5. A quick connector according to claim 1, wherein said tubular female element has a second restricting protrusion which extends across said U-shaped slot, from one of said free end portion of said tongue portion and an opposed portion of a slot defining face that is formed in said cylindrical wall of said first receiving portion and that is opposed to said free end portion of said tongue portion; and wherein said tubular female element has a second recess portion which is provided in the other of said free end portion of said tongue portion and said opposed portion of said slot defining face, such that said second restricting protrusion and said second recess portion are superposed on each other with a predetermined radial spacing distance therebetween in said redial direction, for thereby preventing said free end portion of said tongue portion from being displaced outwardly in said radial direction over a distance not smaller than said predetermined radial spacing distance.

6. A quick connector according to claim 2, wherein said U-shaped slot has a second slot part which is formed between said annular surface of said annular stop element and a side face of said tongue portion that is closer to said other axial end of said tubular female element than the other side face of said tongue portion, said second slot part extending in said circumferential direction of said tubular female element; and wherein said tubular female element has a third restricting protrusion which protrudes into said second slot part, from one of a portion of said side face of said tongue portion that is located in said free end portion, and a portion of said annular surface of said annular stop element that is opposed to said portion of said side face of said tongue portion, for thereby limiting displacement of said free end portion of said tongue portion toward said other axial end of said tubular female element, upon introduction of said introduced end portion of said tubular male element into said axial hole of said tubular female element.

7. A quick connector according to claim 1, wherein said tubular female element includes a first tubular member having axially opposite end portions one of which is provided by said first receiving portion, a second tubular member having axially opposite end portions one of which is provided by said second receiving portion, and connecting means for connecting said first and second tubular members such that said first tubular member is connected at the other of the axially opposite end portions thereof to said second receiving portion of said second tubular member, with a coaxial relationship between said first and second tubular members.

8. A quick connector according to claim 1, wherein said tubular female element includes a first tubular member having axially opposite end portions one of which is provided by said first receiving portion, a second tubular member having axially opposite end portions one of which is provided by said second receiving portion, and connecting means for connecting said first and second tubular members such that said first tubular member is connected at the other of the axially opposite end portions thereof to said second receiving portion of said second tubular member, with a coaxial relationship between said first and second tubular members; and wherein said connecting means is constituted by a fitting hole which is formed in an extreme end portion of said one of the axially opposite end portions of said second tubular member, and said annular stop element which is provided in said other of the axially opposite portions of said first tubular member and which is fitted in said fitting hole.

9. A quick connector according to claim 1, wherein said tubular female element includes a first tubular member having axially opposite end portions one of which is provided by said first receiving portion, a second tubular member having axially opposite end portions one of which is provided by said second receiving portion, and connecting means for connecting said first and second tubular members such that said first tubular member is connected at the other of the axially opposite end portions thereof to said second receiving portion of said second tubular member, with a coaxial relationship between said first and second tubular members; and wherein said connecting means is constituted by an engaging portion which is formed in an outer circumferential surface of said second receiving portion that is included in said one of the axially opposite end portions of said second tubular member, and an engaging arm which extends from an outer circumferential surface of said annular stop element provided in said other of the axially opposite portions of said first tubular member toward said other of the axially opposite end portions of said second tubular member and which is brought into engagement with said engaging portion.

10. A quick connector according to claim 1, wherein said tubular female element is provided by a single piece which is formed of a thermosetting resin material through a molding operation.

11. A quick connector according to claim 1, wherein each of said tongue portions has a width which reduces as said tongue portion extends toward said free end portion.

12. A quick connector according to claim 1, wherein each of said tongue portions has a thickness which reduces as said tongue portion extends toward said free end portion.

13. A quick connector according to claim 1, wherein each of said tongue portions has an operating portion which protrudes radially outwardly from an outer circumferential surface of said free end portion.

14. A quick connector comprising:
    a tubular male element having an annular protrusion portion which is formed on an outer circumferential surface of an introduced end portion of said tubular male element and which is spaced apart from an axial end of said tubular male element by a predetermined distance; and
    a tubular female element having an opening end portion in one of axially opposite end portions thereof, through which said tubular male element is introduced into said tubular female element; a fitting end portion in the other of said axially opposite end portions thereof, onto which a tube is to be fitted so as to be fixed to said tubular female element;

said tubular female element having an annular stop element which is located in an axial end portion of said one of axially opposite end portions and which protrudes radially inwardly from an inner circumferential surface of said one of axially opposite end portions, said annular stop element having an inside diameter that is slightly larger than an outside diameter of said introduced end portion of said tubular male element, so that said annular stop element is opposed to said annular protrusion portion of said tubular male element so as to be brought into abutting-contact with said annular protrusion portion, for thereby limiting movement of said tubular male element toward said other of said axially opposite end portions of said tubular female element away from said one of axially opposite end portions of said tubular female element, when said introduced end portion of said tubular male element is introduced into said opening end portion;

said tubular female element having a tongue portion which is defined by a slot formed through a cylindrical wall of an axially intermediate portion of said tubular female element and which extends in a circumferential direction of said tubular female element;

wherein said tongue portion has a free end portion and a proximal end portion in one and the other of circumferentially opposite end portions thereof, respectively; and wherein said tongue portion has an engaging protrusion portion which protrudes from said free end portion inwardly in a radial direction of said tubular female element, said tongue portion being elastically deformable so that said free end portion of said tongue portion is displaced at least in said radial direction for permitting said annular protrusion portion of said tubular male element to be positioned on one of axially opposite sides of said engaging protrusion portion which is remote from said one of the axially opposite end portions of said tubular female element upon introduction of said tubular male element into said tubular female element, said tongue portion being restorable from the elastic deformation to an original shape thereof for permitting said annular protrusion portion of said tubular male element to be brought into engagement with said engaging protrusion portion of said tongue portion.

15. A quick connector according to claim 14, further comprising an annular sealing member for assuring a fluid-tightness between said tubular male element and said tubular female element,
    wherein said tubular female element includes a first tubular member which provides at least said one of the axially opposite end portions and said axially intermediate portion of said tubular female element, and a second tubular member which provides at least said other of the axially opposite end portions of said tubular female element and which is connected with said first tubular member by connecting means so as to be fixed to said first tubular member with a coaxial relationship between said first and second tubular members;
    wherein said second tubular member has a large diameter portion at which said second tubular member is connected with said first tubular member, and a small diameter portion which has an inner circumferential surface whose diameter is smaller than that of an inner circumferential surface of said large diameter portion and which is contiguous to said large diameter portion in an axial direction of said tubular female element body, wherein said first tubular member has an annular stop element located in an axial end thereof at which said first tubular member is connected with said second tubular member, said annular stop element protruding radially inwardly from an inner circumferential surface of said axial end of said first tubular member and having an radially inner end which is distant from the axis of said tubular female element by a radial distance smaller than a radius of the inner circumferential surface of said large diameter portion of said second tubular member, and wherein said annular sealing member is fitted in the inner circumferential surface of said large diameter portion of said second tubular member, so as to be interposed between said annular stop element and a shoulder surface which connects the inner circumferential surfaces of said large and small diameter portions of said second tubular member, and so as to be fluid-tightly gripped by and between the inner circumferential surface of said large diameter portion of said second tubular member and a portion of said outer circumferential surface of said tubular male member which portion is closer to said axial end of said tubular male member than said annular protrusion portion, when said tubular male member is introduced into said tubular female element.

* * * * *